(12) United States Patent
Gong et al.

(10) Patent No.: US 12,469,396 B2
(45) Date of Patent: Nov. 11, 2025

(54) MONITORING METHOD AND SYSTEM

(71) Applicant: SZ DJI TECHNOLOGY CO., LTD., Shenzhen (CN)

(72) Inventors: Ming Gong, Shenzhen (CN); Bingzhen Yang, Shenzhen (CN); Zhongqian You, Shenzhen (CN); Guohao Zhan, Shenzhen (CN); Peng Xie, Shenzhen (CN); Xiaohang Zhong, Shenzhen (CN); Naibo Wang, Shenzhen (CN); Xingsen Lin, Shenzhen (CN); Xiongbin Rao, Shenzhen (CN); Renqin Deng, Shenzhen (CN); Wenyue Chen, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/123,704

(22) Filed: Mar. 20, 2023

(65) Prior Publication Data
US 2023/0237918 A1    Jul. 27, 2023

Related U.S. Application Data

(63) Continuation of application No. 16/894,832, filed on Jun. 7, 2020, now Pat. No. 11,610,496, which is a
(Continued)

(51) Int. Cl.
*G08G 5/26*    (2025.01)
*G06F 21/60*   (2013.01)
(Continued)

(52) U.S. Cl.
CPC .............. *G08G 5/26* (2025.01); *G06F 21/602* (2013.01); *G08G 5/53* (2025.01); *G08G 5/55* (2025.01);
(Continued)

(58) Field of Classification Search
CPC ...... G08G 5/0013; G08G 5/0082; G08G 5/26; G08G 5/265; G08G 5/53; G08G 5/55;
(Continued)

(56) References Cited

U.S. PATENT DOCUMENTS 6,653,970 B1  11/2003  Mitra
8,908,573 B1  12/2014  Wang et al.
(Continued)

FOREIGN PATENT DOCUMENTS

AU    2015364404 A1   7/2017
CN      101127937 A   2/2008
(Continued)

OTHER PUBLICATIONS

Research in Motion, "RIM Device Java Library: Class DatagramTransportBase," 2007, http://www.geekandproud.net/blackberry/docs/api/net/rim/device/api/io/DatagramTransportBase.html (Year: 2007).*
(Continued)

*Primary Examiner* — Spencer D Patton
(74) *Attorney, Agent, or Firm* — ANOVA LAW GROUP, PLLC

(57) ABSTRACT

A method for monitoring an unmanned aerial vehicle (UAV) includes a processor obtaining a datagram based on monitoring data for a UAV-detector communication between the UAV and one or more detectors. The monitoring data indicates at least one of a location of the UAV or a location of a control station in communication with the UAV. The method further includes determining a risk level by retrieving pre-stored risk information associated with the UAV based on the datagram.

20 Claims, 13 Drawing Sheets

Related U.S. Application Data continuation of application No. 16/030,544, filed on Jul. 9, 2018, now Pat. No. 10,679,510, which is a continuation of application No. PCT/CN2017/077546, filed on Mar. 21, 2017.

(51) Int. Cl.
| | |
|---|---|
| *G08G 5/53* | (2025.01) |
| *G08G 5/55* | (2025.01) |
| *G08G 5/57* | (2025.01) |
| *G08G 5/72* | (2025.01) |
| *H04L 27/34* | (2006.01) |
| *H04W 12/64* | (2021.01) |
| *H04W 28/06* | (2009.01) |

(52) U.S. Cl.
CPC ............... *G08G 5/57* (2025.01); *G08G 5/727* (2025.01); *H04L 27/34* (2013.01); *H04W 12/64* (2021.01); *H04W 28/065* (2013.01); *B64U 2201/20* (2023.01)

(58) Field of Classification Search
CPC ........ G08G 5/57; G08G 5/727; B64C 39/024; B64C 2201/146; G05D 1/002; G05D 1/101; H04W 4/40; H04W 4/44; H04W 4/046; H04W 28/065; H04W 12/64; H04L 27/34; H04M 1/72533; G06F 21/602; G06Q 40/08; G16Y 10/50; B64U 2201/20

See application file for complete search history.

(56) References Cited

U.S. PATENT DOCUMENTS

| | | | |
|---|---|---|---|
| 9,374,751 B1* | 6/2016 | Mauer | G05D 1/0022 |
| 9,405,005 B1* | 8/2016 | Arteaga | G08G 5/55 |
| 10,073,449 B1 | 9/2018 | Sait | |
| 10,299,106 B1 | 5/2019 | Cooper | |
| 10,803,757 B2 | 10/2020 | Jager | |
| 2005/0057395 A1 | 3/2005 | Atkinson et al. | |
| 2010/0224732 A1 | 9/2010 | Olson et al. | |
| 2012/0237028 A1* | 9/2012 | Khazan | G05D 1/0022 |
| | | | 380/258 |
| 2013/0027568 A1 | 1/2013 | Zou et al. | |
| 2013/0202117 A1 | 8/2013 | Brungart et al. | |
| 2014/0316616 A1 | 10/2014 | Kugelmass | |
| 2015/0111599 A1* | 4/2015 | Yamasaki | G08G 1/096716 |
| | | | 455/456.1 |
| 2015/0171956 A1 | 6/2015 | Wang et al. | |
| 2015/0234387 A1 | 8/2015 | Mullan et al. | |
| 2015/0254988 A1 | 9/2015 | Wang et al. | |
| 2015/0371136 A1 | 12/2015 | Goossen et al. | |
| 2016/0125740 A1 | 5/2016 | Pasko et al. | |
| 2016/0129998 A1 | 5/2016 | Welsh et al. | |
| 2016/0171896 A1 | 6/2016 | Buchmueller et al. | |
| 2016/0280370 A1 | 9/2016 | Canavor et al. | |
| 2016/0376004 A1 | 12/2016 | Claridge et al. | |
| 2016/0381699 A1* | 12/2016 | Rubin | H04W 36/02 |
| | | | 370/329 |
| 2017/0004662 A1 | 1/2017 | Gong et al. | |
| 2017/0006417 A1 | 1/2017 | Canoy et al. | |
| 2017/0092138 A1* | 3/2017 | Trundle | G08B 13/196 |
| 2017/0123413 A1 | 5/2017 | Ye et al. | |
| 2017/0150423 A1* | 5/2017 | Yang | G08G 1/096791 |
| 2017/0233071 A1 | 8/2017 | Pilskalns et al. | |
| 2018/0061251 A1* | 3/2018 | Venkatraman | G01C 21/20 |
| 2018/0129882 A1* | 5/2018 | Seeber | G06T 7/11 |
| 2018/0130359 A1 | 5/2018 | Clark et al. | |
| 2018/0143627 A1 | 5/2018 | Lee et al. | |
| 2018/0242186 A1 | 8/2018 | Muscariello et al. | |
| 2018/0306928 A1 | 10/2018 | Gentry | |
| 2020/0213936 A1* | 7/2020 | Fan | H04W 48/18 |

FOREIGN PATENT DOCUMENTS

| | | |
|---|---|---|
| CN | 101236431 A | 8/2008 |
| CN | 101395640 A | 3/2009 |
| CN | 101790248 A | 7/2010 |
| CN | 101960502 A | 1/2011 |
| CN | 102147255 A | 8/2011 |
| CN | 202150183 U | 2/2012 |
| CN | 102637023 A | 8/2012 |
| CN | 102679951 A | 9/2012 |
| CN | 102682626 A | 9/2012 |
| CN | 102685467 A | 9/2012 |
| CN | 102955478 A | 3/2013 |
| CN | 203101647 U | 7/2013 |
| CN | 103490842 A | 1/2014 |
| CN | 103499975 A | 1/2014 |
| CN | 103901839 A | 7/2014 |
| CN | 104539906 A | 4/2015 |
| CN | 104570872 A | 4/2015 |
| CN | 104680853 A | 6/2015 |
| CN | 104718509 A | 6/2015 |
| CN | 104750103 A | 7/2015 |
| CN | 104950907 A | 9/2015 |
| CN | 104956749 A | 9/2015 |
| CN | 105006646 A | 10/2015 |
| CN | 105047022 A | 11/2015 |
| CN | 105138009 A | 12/2015 |
| CN | 105139693 A | 12/2015 |
| CN | 105187384 A | 12/2015 |
| CN | 105357220 A | 2/2016 |
| CN | 105448137 A | 3/2016 |
| CN | 205113687 U | 3/2016 |
| CN | 105549463 A | 5/2016 |
| CN | 105556408 A | 5/2016 |
| CN | 105608930 A | 5/2016 |
| CN | 105608931 A | 5/2016 |
| CN | 105632246 A | 6/2016 |
| CN | 105676856 A | 6/2016 |
| CN | 205353762 U | 6/2016 |
| CN | 105744636 A | 7/2016 |
| CN | 105761550 A | 7/2016 |
| CN | 105766046 A | 7/2016 |
| CN | 105828345 A | 8/2016 |
| CN | 105842683 A | 8/2016 |
| CN | 105869442 A | 8/2016 |
| CN | 105871636 A | 8/2016 |
| CN | 105892473 A | 8/2016 |
| CN | 205451514 A | 8/2016 |
| CN | 105939533 A | 9/2016 |
| CN | 105955301 A | 9/2016 |
| CN | 106054915 A | 10/2016 |
| CN | 205679761 U | 11/2016 |
| CN | 106227239 A | 12/2016 |
| CN | 106230913 A | 12/2016 |
| CN | 106233219 A | 12/2016 |
| CN | 106297417 A | 1/2017 |
| CN | 106325290 A | 1/2017 |
| CN | 106335646 A | 1/2017 |
| CN | 106354153 A | 1/2017 |
| CN | 205862615 A | 1/2017 |
| CN | 106373434 A | 2/2017 |
| CN | 106375062 A | 2/2017 |
| CN | 106504586 A | 3/2017 |
| CN | 108513640 A | 9/2018 |
| CN | 108513696 A | 9/2018 |
| CN | 108684204 A | 10/2018 |
| CN | 108701419 A | 10/2018 |
| CN | 109477891 A | 3/2019 |
| EP | 2177966 A2 | 4/2010 |
| EP | 3443727 A1 | 2/2019 |
| JP | 2013169972 A | 9/2013 |
| JP | 2016171458 A | 9/2016 |
| JP | 2016534468 A | 11/2016 |
| KR | 20110101602 A | 9/2011 |
| KR | 20180066647 A | 6/2018 |
| RU | 2540982 C1 | 2/2015 |
| WO | 2016154946 A1 | 3/2015 |
| WO | 2015155143 A1 | 10/2015 |
| WO | 2016028360 A2 | 2/2016 |

(56) References Cited

FOREIGN PATENT DOCUMENTS

| WO | 2016125161 | A1 | 8/2016 |
|---|---|---|---|
| WO | 2016148989 | A1 | 9/2016 |
| WO | 2016150427 | A1 | 9/2016 |
| WO | 2016154947 | A1 | 10/2016 |
| WO | 2016154948 | A1 | 10/2016 |
| WO | 2016154949 | A1 | 10/2016 |
| WO | 2017017984 | A1 | 2/2017 |
| WO | 2017034839 | A1 | 3/2017 |
| WO | 2017044079 | A1 | 3/2017 |
| WO | 2018170733 | A1 | 9/2018 |
| WO | 2018170734 | A1 | 9/2018 |
| WO | 2018170735 | A1 | 9/2018 |
| WO | 2018170736 | A1 | 9/2018 |
| WO | 2018170737 | A1 | 9/2018 |
| WO | 2018170739 | A1 | 9/2018 |

OTHER PUBLICATIONS

Google, "Google UAS Airspace System Overview," 2015, https://www.nasa.gov/sites/default/files/atoms/files/googleuasairspacesystemoverview5pager-508_0.pdf (Year: 2015).*

Kaartinen, et al., "Encryption and Authentication of 802.11p Traffic Radio," Jun. 2016, International Symposium on Small-scale Intelligent Manufacturing Systems, pp. 77-82 (Year: 2016).*

Corson, Jackson, "Wireless Reliability—Guard Intervals," Jun. 16, 2014, InterOperability Laboratory, University of New Hampshire, https://www.iol.unh.edu/blog/2014/06/16/wireless-reliability-guard-intervals (Year: 2014).*

Google, "Googe UAS Airspace System Overview", 2015, https://utm.arc.nasa.gov/docs/GoogleUASAirspaceSystemOverview5pager[1].pdf (Year:2015).

Eckhoff et al., "On the Necessity of Accurate IEEE 802.11p Models for IVC Protocol Simulation", 2012, http://www.ccs-abs.org/bib/eckhoff2012necessity/eckhoff2012necessity.pdf (Year: 2012).

World Intellectual Property Organization (WIPO) International Search Report for PCT/CN2017/077530 Oct. 27, 2017 5 Pages.

World Intellectual Property Organization (WIPO) International Search Report for PCT/CN2017/077513 Dec. 22, 2017 8 Pages.

World Intellectual Property Organization (WIPO) International Search Report for PCT/CN2017/077515 Dec. 1, 2017 5 Pages.

World Intellectual Property Organization (WIPO) International Search Report for PCT/CN2017/077529 Dec. 26, 2017 5 Pages.

World Intellectual Property Organization (WIPO) International Search Report for PCT/CN2017/077532 Nov. 30, 2017 5 Pages.

Kamkar, Samy, "SkyJack", Dec. 2013, www.samy.pl/skyjack (Year: 2013).

State Intellectual Property Office of the Peoples Republic of China, International Search Report, PCT/CN2017/077546, Mailed Dec. 26, 2017, 3 Pages.

Kozierok, Charles M., "The TCP/IP Gude—IP Datagram Encapsulation", Sep. 20, 2005, http://www.tcpipguide.com/free/t_IPDatagramEncapsulation.htm (Year: 2005).

Richard Blockley, "Dynamics and Control", Jun. 30, 2016. p. 237-238.

Google, "Google LIAS Airspace System Overview," 2015, https://www.nasa.gov/sites/default/files/atoms/files/googleuasairspacesystemoverview5pager-508_0.pdf (Year: 2015).

Qiang Man et al. Research on Security Monitoring and Health Management System of Medium-range UAV, IEEE, Dec. 31, 2009, pp. 854-857.

* cited by examiner

MONITORING METHOD AND SYSTEM

CROSS-REFERENCE TO RELATED APPLICATIONS

This application is a continuation of application Ser. No. 16/894,832, filed on Jun. 7, 2020, which is a continuation of application Ser. No. 16/030,544, filed Jul. 9, 2018, now U.S. Pat. No. 10,679,510, which is a continuation of International Application No. PCT/CN2017/077546, filed Mar. 21, 2017, the entire contents of both of which are incorporated herein by reference.

BACKGROUND

Aerial vehicles such as unmanned aerial vehicles (UAVs) can be used for performing surveillance, reconnaissance, and exploration tasks for military and civilian applications. Such vehicles may carry a payload configured to perform a specific function. UAVs have expanded a dimension of individuals' lives. However, as the use of UAVs has become more prevalent, safety issues and challenges arise. For instance, UAVs systems may potentially be used for invading privacy, or carrying out terrorist and/or criminal activities towards a location where personal, public, commercial, educational, athletic, entertainment or governmental activities may occur.

Traditional methods of detecting or monitoring a UAV include radar for detecting an object. Such methods are limited by the UAV size or material of the UAV. In another example, a UAV may be detected based on recognizing a sound generated by a UAV but this technique may require a significant amount of data processing. In another example, a UAV may be detected based on visual detection technique but this technique may not work well in distinguishing a UAV from other movable objects.

SUMMARY

Thus, a need exists for improved systems and methods of monitoring a movable object. A further need exists for improved system and method of regulating a movable object upon detection of the movable object. The present disclosure provides systems, methods, and devices related to detecting and monitoring a movable object. The systems and methods may be deployed to monitor an area or space from ground level to several thousand feet above ground level. In some embodiments, the movable object may be an unmanned aerial vehicle (UAV). One or more movable objects may be monitored and regulated by the system within a particular region.

In one aspect, a method for monitoring an unmanned aerial vehicle (UAV) is provided. The method may comprise: generating, with aid of one or more processors, a datagram comprising monitoring data indicating at least one of: a location of the UAV or a location of a control station in communication with the UAV; and transmitting the datagram along with working data for communication between the UAV and the control station such that datagram can be received by the one or more detectors within a range of the UAV.

In a separate yet related aspect, a system for monitoring an unmanned aerial vehicle (UAV) is provided. The system may comprise: one or more processors configured to generate a datagram, the datagram comprising monitoring data indicating at least one of: a location of the UAV or a location of a control station in communication with the UAV; and one or more transmitters configured to transmit the datagram along with working data transmitted between the UAV and the control station such that datagram can be received by the one or more detectors within a range of the UAV.

In some embodiments, the datagram is transmitted using a data transmission unit. In some cases, the data transmission unit includes a data transmission frame for instance a management frame. In some cases, the data transmission unit includes a subframe. In alternatively cases, the data transmission unit includes a plurality of subframes or frames. In some cases, the datagram comprises a plurality of sub-datagrams such at the data transmission unit comprises a plurality of sub-datagrams or one sub-datagram. In some instances, each sub-datagram comprises at least an index for the one or more detectors to reconstruct the datagram. The data transmission unit may have fixed length or variable length.

In some embodiments, the datagram is transmitted cyclically with fixed time intervals or variable time intervals. In some embodiments, the datagram is transmitted in response to a probe request generated by the one or more detectors.

In some embodiments, the datagram is inserted into one or more data transmission units that comprise at least a portion of the working data. In some cases, the portion of the working data comprises data for flight control of the UAV and in some cases, the portion of the working data comprises information related to a communication channel between the UAV and the control station. In some cases, the datagram is transmitted differently than the portion of the working data in the one or more transmission units in at least one of the working frequency band, modulation schemes, data formats and communication protocols. In some cases, the portion of the working data may be deciphered by the control station but not by the one or more detectors. In some cases, the portion of the working data comprises image data captured by one or more image sensors on-board the UAV. In some cases, the datagram is transmitted using a low-order modulation scheme that is different than the modulation scheme used for the image data or the datagram is transmitted using a coding scheme different than the coding scheme used for the image data.

In some embodiments, the datagram is not encrypted. Alternatively, the datagram is encrypted using a key known to the one or more detectors. In some embodiments, the datagram is transmitted using a downlink of the UAV. In some cases, the one or more processors or the one or more transmitters are on-board the UAV. In some cases, the location of the UAV and the location of the control station are obtained via one or more sensors on-board the UAV. The downlink may be used for transmitting the working data collected by one or more sensors on-board the UAV such as image data collected by one or more image sensors on-board the UAV. In some cases, the working data is encoded using a coding scheme different than the coding scheme used for transmitting the datagram for example the working data is modulated using Quadrature Amplitude Modulation (QAM). In some embodiments, the datagram is transmitted using an uplink of the UAV. In some cases, the one or more processors or the one or more transmitters are remote to the UAV. In some cases, the one or more processors or the one or more transmitters are located at the control station. In some cases, the uplink is used for transmitting working data for controlling operations of the UAV. In some cases, the working data is encoded using a coding scheme different than the coding scheme used for transmitting the datagram. In some cases, the working data is transmitted using a modulation scheme including at least one of Direct Sequence Spread Spectrum (DSSS), Frequency Hopping Spread Spectrum (FHSS), or Frequency Shift Keying (FSK).

In some embodiments, the monitoring data comprises a location of the UAV. In some embodiments, a flight trajectory of the UAV is presented on a display based on the location of the UAV and a risk level associated with the UAV is determined based on the flight trajectory of the UAV. In some embodiments, the monitoring data comprises an identifier of the UAV, an identity of an owner of the UAV, a type of the UAV, an identifier of the control station or a location of the control station.

In another aspect, method for assessing risk associated with an unmanned aerial vehicle (UAV) is provided. The method may comprise: obtaining, using a detector, a datagram transmitted from or to the UAV when the UAV is within a range of the detector, wherein the datagram is transmitted along with working data for communication between the UAV and a control station; deciphering the datagram with aid of one or more processors to obtain a monitoring data about the UAV; and assessing a risk level associated with the UAV based on the monitoring data.

In a separate yet related aspect, a system for assessing risk associated with an unmanned aerial vehicle (UAV) is provided. The system may comprise: detector configured to obtain a datagram transmitted from or to the UAV when the UAV is within a range of the detector, wherein the datagram is transmitted along with working data for communication between the UAV and a control station; and one or more processors configured to: (a) decipher the datagram to obtain a monitoring data about the UAV, and (b) assess a risk level associated with the UAV based on the monitoring data.

In another related aspect, a tangible computer readable medium storing instructions that, when executed by one or more servers, causes the one or more servers to perform a computer-implemented method for assessing risk associated with an unmanned aerial vehicle (UAV) is provided. The method may comprise: obtaining a monitoring data from one or more detectors, wherein the monitoring data indicates at least one of: a location of the UAV and/or a location of a remote controller in communication with the UAV; and assessing a risk level associated with the UAV based on the monitoring data.

In some embodiments, the risk level associated with the UAV is assessed based on information retrieved from a database coupled to the one or more servers. In some cases, the information relates to an owner of the UAV, purchase time, and purchase site of the UAV. In some cases, the risk level is retrieved from the database according to an identifier of the UAV that is comprised by the monitoring data. In some embodiments, the method further comprises obtaining information about an operational state of the one or more detector and generating instructions to control the one or more detectors based on the information about the operational state. In some cases, the instructions comprise enabling or disabling the one or more detectors, setting one or more parameters of the one or more detectors.

In some embodiments, the risk level associated with the UAV is assessed based on a flight trajectory of the UAV and the flight trajectory of the UAV is generated based on a sequence of the monitoring data. In some embodiments, the risk level associated with the UAV is assessed based on a distance between the UAV and one or more detectors or based on the number of detectors that have provided monitoring data associated with the UAV.

In some embodiments, the detector is portable. In some examples, the detector has a weight less than 2 kg. In some cases, the detector is located remote to the control station and not in communication with the control station. In some embodiments, the one or more processors are provided on a mobile device in communication with the detector. The mobile device may be, for example a smartphone, tablet, or laptop computer. In some cases, the detector is wired to the mobile device for example the wired connection is a USB connection between the detector and the mobile device. In some cases, the mobile device is in communication with a remote server from which additional information about the UAV is retrieved. In alternative embodiments, the one or more processors and the detector are on-board the same UAV detection device. For instance, the detector and the one or more processors are in or on the same housing. In some cases, the range of the detector is at least 3 km. The detector may be a radiofrequency scanner that comprises a single antenna or multiple antennas.

In some embodiments, a plurality of the detectors are organized into zones to individually or collectively detect the UAV. In some cases, the plurality of the detectors are configured to obtain a plurality of the datagrams that are used to determine a risk level associated with the UAV. In some cases, a plurality of the datagrams obtained by the plurality of the detectors are used to monitor the UAV within the corresponding zone and a size of the zone is associated with the number of detectors. In some cases, the risk level is determined based on the number of UAVs detected within the corresponding zones.

In some embodiments, the detector is configured to monitor a plurality of the UAVs by obtaining a plurality of datagrams transmitted from or to the plurality of the UAVs. The plurality of UAVs are within a range of the detector and the plurality of datagrams are obtained by the detector simultaneously or sequentially. In some cases, the detector is configured to scan one or more pre-determined frequency channels. The plurality of datagrams are transmitted using the same data transmission mode or different data transmission modes. The plurality of datagrams may be transmitted using different data transmission modes concurrently or in different time slots. In some cases, the risk level associated with each UAV is assessed and one or more of the plurality of UAVs with a high risk level are identified. In some cases, the detector is configured to selectively monitor the one or more of the plurality of UAVs with the high risk level.

In another aspect of the disclosure, a method of monitoring and regulating an unmanned aerial vehicle (UAV) may be provided. The method may comprise: assessing a monitoring state of the UAV, wherein the monitoring state is assessed based at least in part on a status of a location module, validity of location data or a status of a communication module; transmitting a datagram comprising monitoring data indicating at least one of: a location of the UAV and/or a location of a remote controller in communication with the UAV when the monitoring state is assessed to be valid; and determining a set of regulation rules when the monitoring state is assessed to be invalid.

In a separate yet related aspect, a system of monitoring and regulating an unmanned aerial vehicle (UAV) is provided. The system may comprise: one or more processors configured to: assess a monitoring state of the UAV, wherein the monitoring state is assessed based at least in part on a status of a location module, validity of location data or a status of a communication module; determine a set of regulation rules when the monitoring state is assessed to be invalid; or instruct the communication module to transmit a datagram comprising monitoring data indicating at least one of: a location of the UAV or a location of a remote controller in communication with the UAV when the monitoring state is assessed to be valid.

In some embodiments, the method further comprises applying the selected set of regulation rules to regulate at least one of the altitude of the UAV, flight distance and flight time. In some cases, the flight distance is the distance between the UAV and the remote controller. The flight distance is measured based on GPS location of the UAV and the location of the remote controller, based on a wireless signal strength or based on a wireless signal round-trip delay between the UAV and the remote controller.

In some embodiments, the status of the location module includes an operational state of the location module. In some embodiments, the validity of the location data is determined based at least in part on comparing a signal-noise ratio to a threshold. In some embodiments, the status of the communication module is associated with one or more channel characteristics of the communication module, wherein the one or more channel characteristics are selected from the group comprising noise, interference, signal-to-noise ratio, bit error rate, fading rate or bandwidth.

In some embodiments, when the monitoring state is assessed to be invalid, an alert is sent to the control station. In some cases, the control station includes a user interface and information about the monitoring state is displayed to a user on a display coupled to the control station. In some cases, the information comprises the status of the location module, the validity of location data and the status of the communication module. In some embodiments, the one or more processors are on-board the UAV.

In another aspect of the disclosure, a method for monitoring an unmanned aerial vehicle (UAV) is provided. The method may comprise: obtaining, using a detector, a datagram transmitted from or to the UAV when the UAV is within a range of the detector, wherein the datagram is transmitted along with working data for a communication between the UAV and a control station; and deciphering the datagram with aid of one or more processors to obtain a monitoring data indicating at least one of: a location of the UAV or a location of the control station.

In a separate yet related aspect, a system for monitoring an unmanned aerial vehicle (UAV) is provided. The system may comprise: a detector configured to obtain a datagram transmitted from or to the UAV when the UAV is within a range of the detector, wherein the datagram is transmitted along with working data for a communication between the UAV and a control station; and one or more processors configured to decipher the datagram to obtain a monitoring data indicating at least one of: a location of the UAV or a location of the control station.

In some embodiments, the communication between the UAV and the control station uses a data transmission mode selected from a plurality of data transmission modes and the plurality of data transmission modes are known to the detector. In some cases, the detector is configured to scan for the datagram according to the plurality of data transmission modes.

In some embodiments, the detector is configured to monitor a plurality of the UAVs by obtaining a plurality of datagrams transmitted from or to the plurality of the UAVs. The plurality of datagrams are transmitted using the same data transmission mode or different data transmission modes. In some cases, the detector is configured to selectively monitor one or more of the plurality of UAVs according to a risk level.

In another aspect, a method for monitoring a movable object is provided. The method may comprise: obtaining a location of the movable object and/or a location of a remote controller in communication with the movable object; generating a datagram comprising data indicating at least one of: the location of the movable object or the location of a remote controller; and transmitting, with aid of one or more transmitters on-board the movable object, the datagram using a management frame.

In a separate yet related aspect, a system for monitoring a movable object is provided. The system may comprise: one or more sensors configured to obtain a location of the movable object and/or a location of a remote controller in communication with the movable object; one or more processors configured to generate a datagram comprising monitoring data indicating at least one of: a location of the movable object or a location of a remote controller in communication with the movable object; and one or more transmitters on-board the movable object, configured to transmit the datagram using a management frame.

In some embodiments, the management frame is transmitted using a Wi-Fi communication channel. In some cases, the datagram is transmitted using a communication channel between the UAV and the remote controller under 802.11 standards. In some embodiments, the management frame is a broadcasting frame. The broadcasting frame includes a beacon frame or a probe request frame. In some cases, the broadcasting frame comprises working data related to at least a frequency channel in which the broadcasting frame is transmitted. In some embodiments, the management frame is a probe response frame and is transmitted in response to a probe request generated by a detector.

In some embodiments, the datagram is inserted into a field of the management frame such as a vender specific information element field or is a length field of an information element. In some cases, the datagram comprises data for error detection such as cyclic redundancy check (CRC) codes. In some embodiments, the movable object is an aerial vehicle, a land vehicle, a vehicle traversing water body, a mobile phone, a tablet, a laptop, a wearable device, or a digital camera.

In some embodiments, one or more detectors are configured to scan a plurality of frequency channels to detect the management frame. In some cases, the one or more detectors are configured to obtain subsequent datagrams in the frequency channel as indicated in the management frame.

In another aspect of the disclosure, a method for monitoring a movable object is provided. The method may comprise: obtaining a location of the movable object and/or a location of a remote controller in communication with the movable object; generating a datagram comprising monitoring data indicating at least one of: the location of the movable object or the location of the remote controller; and transmitting the datagram in one or more pre-determined time slots or one or more pre-determined frequency channels, wherein the datagram is transmitted along with working data for communication between the movable object and the remote controller.

In a separate yet related aspect, a system for monitoring a movable object is provided. The system may comprise: one or more sensors configured to obtain a location of the movable object and/or a location of a remote controller in communication with the movable object; one or more processors configured to generate a datagram comprising monitoring data indicating at least one of: a location of the movable object or a location of a remote controller in communication with the movable object; and one or more transmitters configured to transmit the datagram in one or more pre-determined time slots or one or more pre-determined frequency channels, wherein the datagram is transmitted along with working data for communication between the movable object and the remote controller.

In some embodiments, the datagram is transmitted using software-defined radio (SDR) techniques. For example, information about the time slot or the one or more frequency channels are specified by the SDR techniques and known to one or more detectors. The method may allow the datagram transmitted in the time division duplex (TDD) mode or frequency division duplex (FDD) mode. In some cases, a sequence of the monitoring subframes are transmitted using frequency hopping on multiple frequencies and a frequency hopping pattern is known to the detection system. In some instances, the frequency hopping pattern is uniquely associated with an identity of the movable object. In some cases, the monitoring subframes are modulated using frequency-shift keying (FSK). In some cases, the datagram is encoded or modulated using orthogonal frequency division multiplexing (OFDM) method. In some embodiments, the datagram further comprises data for synchronization with one or more detectors. In some cases, the datagram comprises a plurality of reference symbols for the detectors to decode the data. In some instances, reference symbols are inserted between data symbols of the datagram and the datagram is deciphered by one or more detectors through detection of the reference symbols. In some instances, each symbol is modulated using modulation schemes selected from the quadrature phase-shift keying (QPSK) or quadrature amplitude modulation (QAM).

In some embodiments, the datagram is transmitted using a monitoring subframe in the time slot. In some cases, a sequence of the monitoring subframes are transmitted cyclically with fixed time intervals. In some cases, a portion of the working data is transmitted using a neighboring subframe of the monitoring subframe and the monitoring subframe is transmitted differently than the neighboring subframes in at least one of the working frequency band, modulation schemes, data formats, duplexing means and communication protocols. In some cases, a guard interval is provided for switching between data transmission in the monitoring subframe and the neighboring subframe and is provided between the monitoring subframe and the neighboring subframe.

In another aspect, a method for monitoring a movable object is provided. The method may comprise: obtaining a location of the movable object and/or a location of a remote controller in communication with the movable object; generating a datagram comprising monitoring data indicating at least one of: the location of the UAV or the location of a remote controller, wherein the datagram comprises a plurality of sub-datagrams; and transmitting one or more of the plurality of sub-datagrams using a data transmission unit, wherein the data transmission unit comprises working data for communication between the movable object and the remote controller.

In a separate yet related aspect, a system for monitoring a movable object is provided. The system may comprise: one or more sensors configured to obtain a location of the movable object and/or a location of a remote controller in communication with the movable object; one or more processors configured to generate a datagram comprising monitoring data indicating at least one of: a location of the movable object or a location of a remote controller in communication with the movable object, wherein the datagram comprises a plurality of sub-datagrams; and one or more transmitters configured to transmit one or more of the plurality of sub-datagrams using a data transmission unit, wherein the data transmission unit comprises working data for communication between the movable object and the remote controller.

In some embodiments, each sub-datagram comprises an index and a subset data of the datagram and one or more detectors are configured to decipher the datagram using the index or one or more detectors are configured to decode and reconstruct the datagram using the indexes. In some embodiments, the plurality of sub-datagrams are transmitted with fixed time intervals or variable time intervals. In some embodiments, the data transmission unit is a subframe such as a downlink subframe or uplink subframe. In some cases, the plurality of sub-datagrams are transmitted using a sequence of subframes. In some cases, the subframes are non-consecutive. In some cases, the sub-datagram is inserted into a field of the subframe such as the frame control header or the physical downlink control channel. In some cases, the datagram uses a modulation or coding scheme different from the data field within the same data transmission unit. For instance, the modulation or coding scheme is low-order or the sub-datagram is modulated using QPSK. In some embodiments, the datagram is transmitted using an uplink or downlink of the movable object and the uplink of the movable object uses a modulation scheme or coding scheme different than the modulation scheme or coding scheme used by the downlink. In some cases, the datagram is transmitted using multi-carrier when it is downlink. The datagram is transmitted in TDD mode or FDD mode.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Systems and methods are provided for monitoring a movable object with improved accuracy and efficiency. In some cases, the provided method may permit monitoring a movable object without substantially alternating pre-existing communication system of the movable object. One or more movable objects within a particular region may be monitored by the system. The movable object may be an aerial vehicle, a land-based vehicle, a vehicle traversing water body or a handheld device. The movable object may be an unmanned aerial vehicle (UAV) that is in wireless communication with external devices. The monitoring method may utilize the pre-existing communication system of the UAV and allow for an improved monitoring and/or regulation of the UAV. The method or system may be utilized to monitor a UAV with improved accuracy such that the accurate location of the UAV or a remote controller, identity of the UAV or the remote controller, and other details about the UAV can be obtained and monitored in real-time. The method or system may be utilized to monitor a UAV with improved efficiency such that one detector may be capable to monitor multiple UAVs simultaneously. The method or system may be applicable to various movable object with a variety of communication systems.

In one aspect, a method for monitoring an unmanned aerial vehicle (UAV) is provided. The method can be used for monitoring any other type of movable object. The method may allow for detection of a UAV by detecting a monitoring datagram transmitted from or to the UAV. The method may allow for monitoring a UAV by obtaining one or more datagrams transmitted using an existing communication system of the UAV. The method may comprise: generating a datagram comprising monitoring data indicating at least one of: a location of the UAV or a location of a control station in communication with the UAV, and the datagram may be generated with aid of one or more processors on-board the UAV; and transmitting the datagram along with working data for communication between the UAV and the control station such that datagram can be received by the one or more detectors within a range of the UAV.

In some embodiments, the UAV may be in wireless communication with a remote control device or a control station. One or more communication channels may be provided between the UAV and the control station for transmitting working data. The UAV may be detected and monitored by one or more detectors. A datagram may be transmitted using the one or more communication channels and received by the one or more detectors. The datagram provides real-time information about the UAV and may be received by one or more monitoring detectors for monitoring the UAV. The method of transmitting the datagram using the existing communication channels of the UAV may be implemented easily without introducing additional component or cost to a communication module of the UAV or without substantially alternating a communication system of the UAV.

Figure 1:
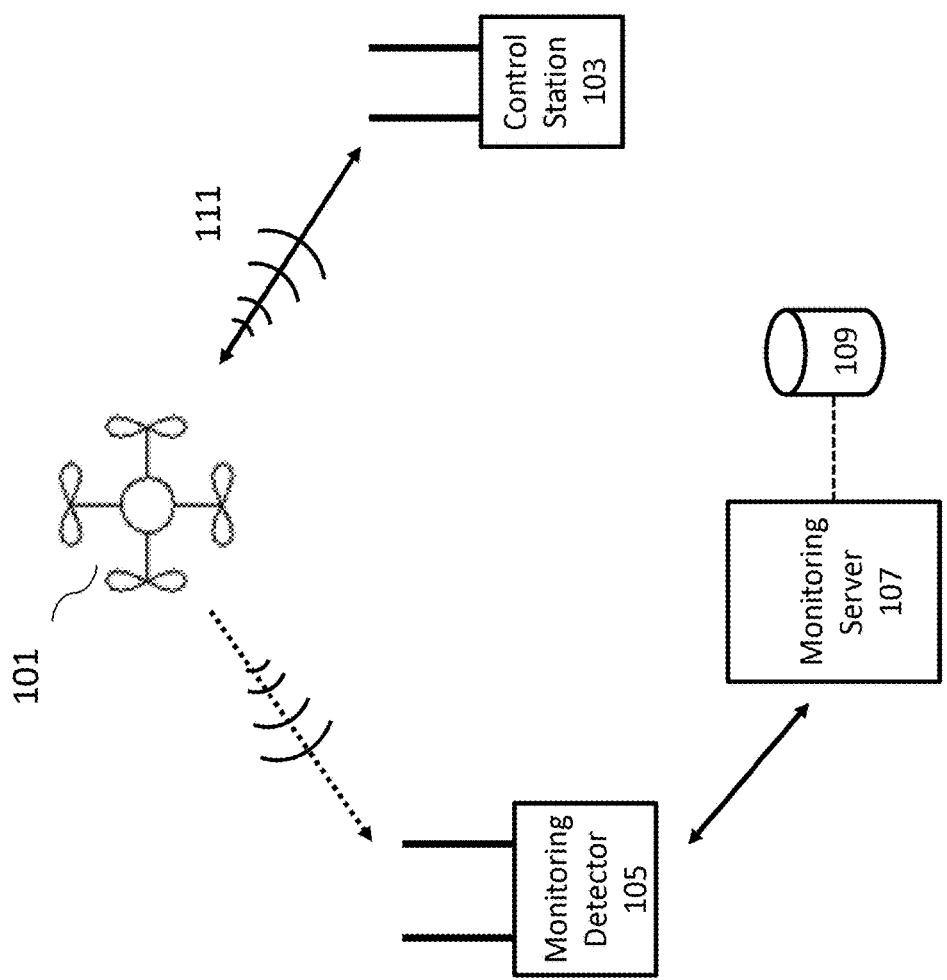
FIG. 1 schematically illustrates an example of monitoring a movable object.

FIG. 1 schematically illustrates an example of monitoring a movable object 101. The movable object 101 may be in communication with a remote control station 103 via one or more communication channels 111. The movable object may be monitored by one or more monitoring detectors 105 when the movable object is within a range of the one or more monitoring detectors 105. In some embodiments, the movable object may by monitored by transmitting one or more datagrams via the communication channel between the movable object and the control station. The one or more monitoring detectors may be configured to receive the one or more datagrams and retrieve further information related to a risk of the movable object from a monitoring server 107. The additional information about the movable object or the risk associated with the identified movable object may be stored in a database 109 accessible to the monitoring server. Details about the monitoring detector, monitoring server and the database are discussed later herein.

Figure 11:
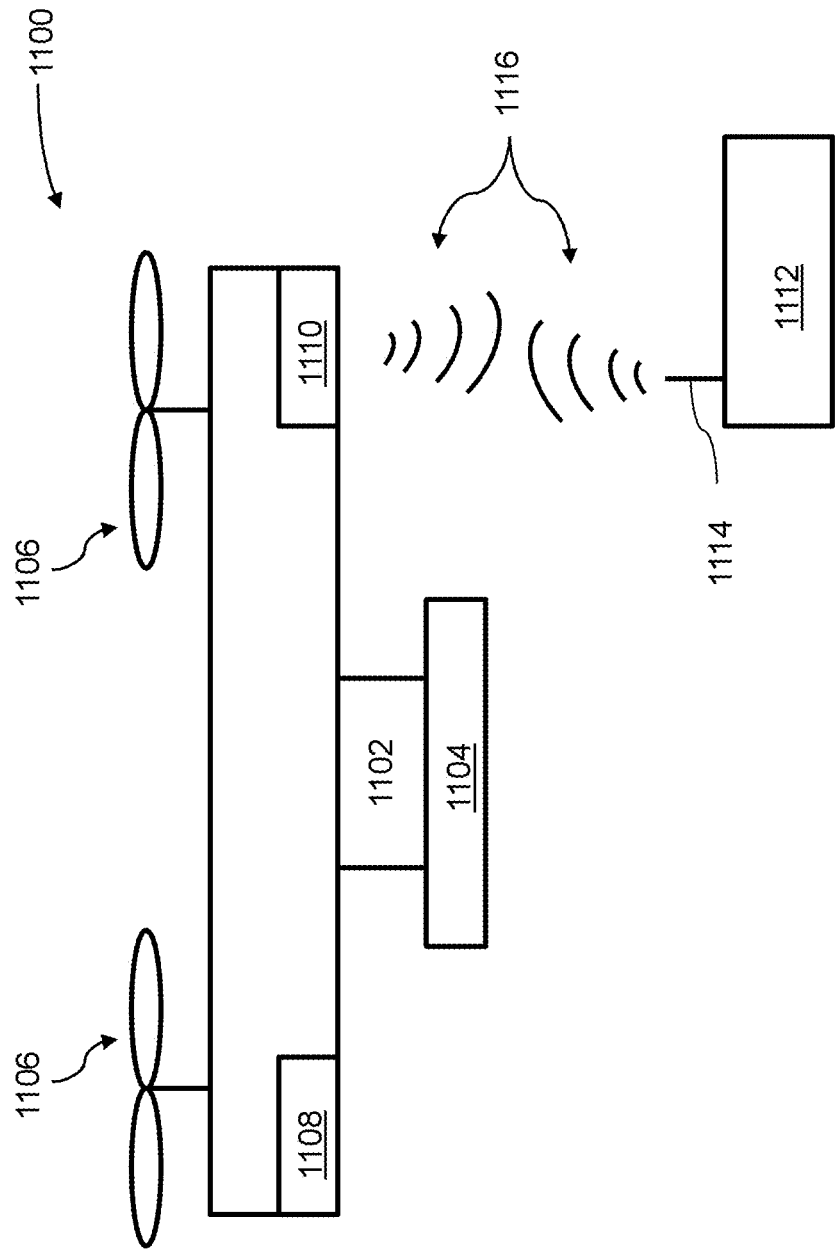
FIG. 11 illustrates a movable object, in accordance with embodiments.

In some embodiments, the movable object may be an UAV. Details about the movable object are described in connection with FIG. 11. FIG. 11 illustrates a movable object 1100, in accordance with embodiments. Although the movable object 1100 is depicted as an aircraft, this depiction is not intended to be limiting, and any suitable type of movable object can be used, as described herein. One of skill in the art would appreciate that any of the embodiments described herein in the context of aircraft systems can be applied to any suitable movable object (e.g., an UAV). In some instances, the movable object may carry a payload 1104. The payload may be provided on the movable object 1100 with or without requiring a carrier 1102. The movable object 1100 may include propulsion mechanisms 1106, a sensing system 1108, and a communication system 1110.

The communication system 1110 enables communication with terminal 1112 (e.g., control station, remote controller, etc.) having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

Depending on the direction of the data transmission, the movable object communication links can be generally categorized as uplinks and downlinks. In some cases, an uplink is primarily responsible for the transmission of control data from a control station or a remote control device (e.g., remote terminal 1112) to the movable object, for example, to achieve real-time flight attitude control of the UAV and/or command automation. The downlink, in some cases, is primarily responsible for the transmission of telemetry data, image data and other data from the movable object to the control station or remote control device (e.g., remote terminal 1112).

The communication system may be used for transmitting working data. In some embodiments, the working data may comprise control, sensor data, telemetry data about the movable object, payload data or any data communicated between the movable object and a remote device/terminal 1112. In some cases, the terminal 1112 can provide control data to one or more of the movable object 1000, carrier 1102, and payload 1104 and receive information from one or more of the movable object 1000, carrier 1002, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the working data from the movable object, carrier and/or payload may include data from one or more sensors (e.g., of the sensing system 1108 or of the payload 1104). The communication channel may be used for transmitting airborne information such as videos and images. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the communication system may allow the movable object 1100 to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

The propulsion mechanisms 1106 can include one or more of rotors, propellers, blades, engines, motors, wheels, axles, magnets, or nozzles, as previously described. For example, the propulsion mechanisms 1106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

In some embodiments, the sensing system may comprise a location module. The location module may be used to determine a location of the movable object. The location may include a latitude, longitude, and/or altitude of the aerial vehicle. The location of the movable object may be determined relative to a fixed reference frame (e.g., geographic coordinates). The location of the movable object may be determined relative to a monitored region. The location of the monitored region relative to the fixed reference frame may be used to determine the relative locations between the movable object and the monitored region. The location module may use any technique or later developed in the art to determine the location of the movable object. For example, the location module may receive a signal comprise a global positioning system (GPS) receiver. In another example, the location module may be an inertial measurement unit (IMU), ultrasonic sensor, visual sensors (e.g., cameras), or communication unit communicating with an external location unit. The external location unit may include a satellite, tower, or other structure that may be capable of providing location information. One or more external location units may utilize one or more triangulation techniques in order to provide a location of the movable object. The location unit of the external device may use any of the techniques described herein including, but not limited to, GPS, laser, ultrasonic, visual, inertial, infrared, triangulation, base stations, towers, relays, or any other technique.

Referring to FIG. 1, one or more communication channels 111 are provided between the movable object 101 and a remote device such as a control station 103. The one or more communication channels may be used for data transmission between the movable object and the control station. The one or more communication channels may be enabled by the communication system of the movable object and the control station as described elsewhere herein. The one or more communication channels may comprise one or more communication links. Depending on the direction of the data transmission, the communication links can be generally categorized as uplinks and downlinks. In some cases, an uplink is primarily responsible for the transmission of control data from the control station or a remote control device to the movable object, for example, to achieve real-time flight attitude control of the UAV and/or command automation. The downlink, in some cases, is primarily responsible for the transmission of telemetry data, image data and other data from the movable object to the control station or remote control device.

In some embodiments, the remote device may be a control station 103. The control station 103 in communication with the movable object 101 may be the same as the remote terminal 1112 described in FIG. 11. The control station may comprise mobile or non-mobile devices. The control station may comprise a remote controller. In some cases, the control station may be interchangeably used as the remote controller. A remote controller may be any type of device. The device may be a computer (e.g., personal computer, laptop computer, server), mobile device (e.g., smartphone, cellular phone, tablet, personal digital assistant), or any other type of device. The device may be a network device capable of communicating over a network.

The remote controller may be handheld. The remote controller may accept inputs from a user via any user interactive mechanism. The device may have any type user interactive component, such as a button, mouse, joystick, trackball, touchpad, pen, inertial sensors, image capturing device, motion capture device, microphone, or touchscreen. The control station may comprise a mobile device such as a remote control terminal, as described elsewhere herein. For example, the mobile device may be a smartphone that may be used to control operation of the UAV. The smartphone may receive inputs from a user that may be used to control flight of the UAV. In some instances, the mobile device may receive data from the UAV. For example, the mobile device may include a screen that may display images captured by the UAV. The mobile device may have a display that shows images captured by a camera on the UAV in real-time. One or more mobile devices may be connected to the UAV via a wireless connection (e.g., Wi-Fi) to be able to receive data from the UAV in real-time. For example, the mobile device may show images from the UAV in real-time. In some instances, the mobile device (e.g., mobile phone) can be connected to the UAV and may be in close proximity to the UAV. For example, the mobile device may provide one or more control signals to the UAV. The mobile device may or may not need to be in close proximity to the UAV to send the one or more control signals. The control signals may be provided in real-time. The user may be actively controlling flight of the UAV and may provide flight control signals to the UAV. The mobile device may or may not need to be in close proximity to the UAV to receive data from the UAV. The data may be provided in real-time.

One or more image capture device of the UAV or other types of sensors may capture data, and the data may be transmitted to the mobile device in real-time. In some instances, the mobile device and UAV may be in close proximity, such as within about 10 miles, 8 miles, 5 miles, 4 miles, 3 miles, 2 miles, 1.5 miles, 1 mile, 0.75 miles, 0.5 miles, 0.3 miles, 0.2 miles, 0.1 miles, 100 yards, 50 yards, 20 yards, or 10 yards.

The movable object 101 can be monitored by detecting a datagram. The datagram may comprise monitoring data indicating at least one of: a location of the movable object 101 or a location of a control station 103 in communication with the movable object. The datagram may be generated by one or more processors on-board the movable object and transmitted using the communication module of the movable object.

Figure 2:
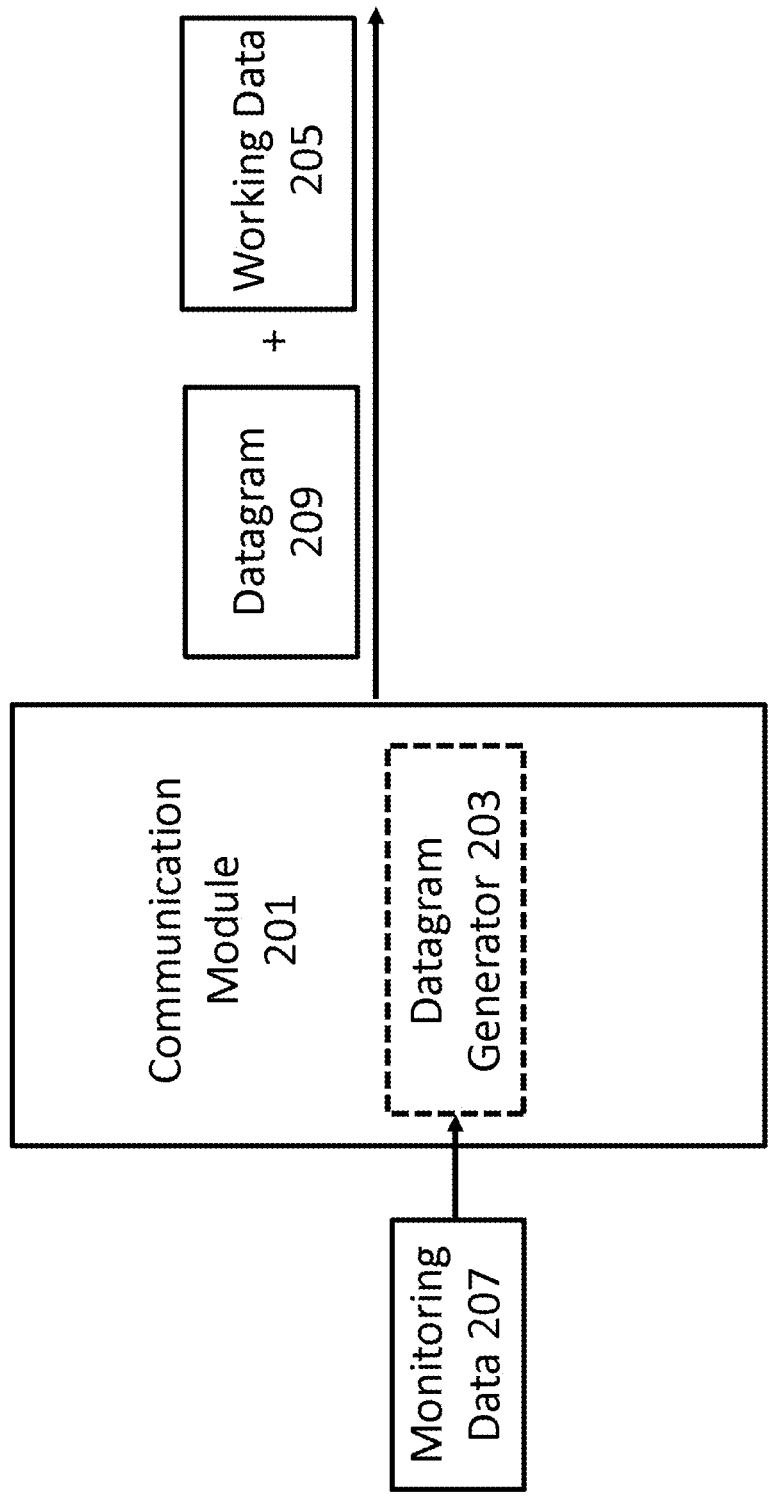
FIG. 2 schematically illustrates an example of generating a datagram and transmitting the datagram along with working data using a communication module of a movable object.

FIG. 2 schematically illustrates an example of generating a datagram 209 and transmitting the datagram along with working data 205 using a communication module 201 of a movable object. In some embodiments, the datagram may comprise monitoring data indicating at least one of: a location of the UAV or a location of a control station in communication with the UAV.

The location of the control station may be determined. This may occur prior to take-off of the UAV and/or while the UAV is in flight. For example, when a UAV is powered on or during an initialization procedure, the location of the UAV may be automatically collected and used to estimate the location of the control station. The location may include a latitude, longitude, and/or altitude of the control station. The location may remain stationary over time, or may change over time. The location of the control station may be determined relative to a fixed reference frame (e.g., geographic coordinates). In some embodiments, the location of the control station may be obtained by the location module of the movable object. For example, prior to take-off of the UAV, the location module may determine the location of the UAV and mark it as the location of the control station. The location module may use any technique or later developed in the art to determine the location of the movable object. For example, the location module may receive a signal comprise a global positioning system (GPS) receiver. In another example, the location module may be an inertial measurement unit (IMU), ultrasonic sensor, visual sensors (e.g., cameras). In some cases, the location of the control station may be determined via a communication unit of the control station or the UAV communicating with an external location unit. The external location unit may include a satellite, tower, or other structure that may be capable of providing location information. One or more external location units may utilize one or more triangulation techniques in order to provide a location of the UAV. For example, the control station may be in communication with the external device, such as a mobile control terminal. The location of the external device may be determined and used to approximate the location of the control station.

In some cases, the location of the control station may be determined while the UAV is in flight. In examples, location module of the UAV may be used to determine the location of the control station while the UAV is in flight. The location module of the UAV may use any of the techniques described herein including, but not limited to, GNSS, GPS, laser, ultrasonic, visual, inertial, infrared, or any other techniques. In some cases, location of the control station may be determined based on the location of the UAV and the position of the control station relative to the UAV. In other examples, the location of the control station may be determined by an external device using any suitable techniques described herein such as triangulation, base stations, towers, relays, and the like. In further examples, location sensors on-board the control station may be used for providing the location of the control station.

The location of the UAV can be obtained by a location module of the UAV as described elsewhere herein. The location module may be on-board the UAV. The location of the UAV may be obtained with aid of one or more sensors on-board the UAV. In some cases, the one or more sensor comprises at least a location sensor. In some cases, the same location module is also used for obtaining location of the control station. Alternatively, location of the UAV and location of the control station are obtained using different techniques or devices.

The location data about the UAV and location data about the control station may not be collected at the same frequency. In some cases, the location data about the UAV may be collected by the location module at a high frequency while the UAV is in-flight such that the location of the UAV can be tracked in real-time. In some cases, the location data about the control station may be obtained prior to take-off of the UAV. The location of the control station may remain stationary over time or the control station may be stationary, and in this case the location data may be collected only once prior to take-off of the UAV or collected at a relatively low frequency. In some cases, the location about the control station can be obtained while the UAV is in-flight. Location of the control station may change over time and the location data about the control station may be collected cyclically to determine the location of the control station in real-time.

The monitoring data 207 may comprise real-time data such as the location of the UAV and/or location of the control station. In some embodiments, the monitoring data 207 may further comprise information related to an identity of the UAV or the control station. For example, the monitoring data may include identity information about the UAV, the control station or the remote controller, and/or the owner of the UAV. The identity information may be stored in a memory storage accessible to one or more processors configured to generate a datagram. The memory storage may be on-board the UAV or remotely accessible to the UAV. The identity information may be stored in long-term memory storage, or may only be stored for a short period. The identity information may be received and buffered. The identity information stored in the memory storage may not be altered.

In some embodiments, the monitoring data 207 may comprise a UAV identifier (e.g., UAV ID). The UAV identifier may be uniquely associated with the UAV. Other UAVs may have different UAV identifier. The unique identifier may optionally be a randomly generated alphanumeric string, or any other type of identifier that may uniquely identifier a UAV from other UAVs. The unique identifier may be generated and issued by an authority entity.

In some embodiments, the monitoring data may comprise an identity of an owner of the UAV such as a user identifier (e.g., USER ID) that identifies the user. The user identifier may be unique to the user. Other users may have different identifiers from user. A user identifier may uniquely differentiate and/or distinguish the user from other individuals. Each user may only be assigned a single user identifier. Alternatively, a user may be able to register multiple user identifiers. In some instances, a single user identifier may be assigned to only a single user. Alternatively, a single user identifier may be shared by multiple users. A user identifier may be in any form such as comprising alphanumeric string, or any other type of identifier.

In some embodiments, the monitoring data may comprise an identifier of the control station or a remote controller. The remote controller may have a remote controller identifier that identifies the remote controller. The remote controller identifier may be unique to the remote controller. Other remote controllers may have different identifiers from the remote controller. A remote controller identifier may uniquely differentiate and/or distinguish the remote controller from other remote controllers. Each remote controller may only be assigned a single remote controller identifier. Alternatively, multiple remote controller identifiers may be registered for a single remote controller. In some instances, a single remote controller identifier may be assigned to only a single remote controller. Alternatively, a single remote controller identifier may be shared by multiple remote controllers. Remote controller identifiers may or may not be associated with a corresponding user identifier.

In some embodiments, the monitoring data may further comprise a type of the UAV. The type of a UAV may be defined by physical components of the UAV, model of the UAV, functions of the UAV or risk level of the UAV. In some cases, UAVs of different types may have different physical characteristics (e.g., models, brands, shapes, sizes, engine power, ranges, battery life, sensors, performance capabilities, payload, payload ratings or capacity) or may be used to perform different missions (e.g., surveillance, videography, communications, delivery). The UAVs of different types may have different security levels or priorities. For example, UAVs of different types may be authorized to perform different activities. For instance, a UAV of a first authorization type may be authorized to enter a region that a UAV of a second authorization type may be not be authorized to enter. UAV types may include different UAV types created by the same manufacturer or designer, or by different manufacturers or designers.

In some embodiments, the identity information or at least one of the UAV identifier, remote controller identifier, UAV type or the user identifier may be used for retrieving additional information about the UAV for assessing a risk level of the UAV. Details about the risk assessment will be discussed later herein.

In some embodiments, the datagram may be transmitted from the UAV by the communication module 201. The communication module can be the same as the communication system 1110 described in FIG. 11. The communication module may be provided on-board the UAV. The communication module may be provided on one or more of the UAV, carrier and payload. The communication module may be used for transmitting working data for communication between the UAV and the control station. The communication module may be configured to enable a downlink data transmission between the UAV and the control station. The communication module may be in communication with a flight controller of the UAV or the sensing system of the UAV. In one example, the communication module may be a wireless module. The wireless module may be a wireless direct module which may permit direct wireless communications with an external device such as the control station. The external device may not be limited to the control station. The external device may optionally be a mobile device, such as a cell phone, smartphone, watch, tablet, remote controller, laptop, or other device. The external device may be a stationary device, e.g., personal computer, server computer, base station, tower, or other structure. The external device may be a wearable device, such as a helmet, hat, glasses, earpiece, gloves, pendant, watch, wristband, armband, legband, vest, jacket, shoe, or any other type of wearable device, such as those described elsewhere herein. Any description herein of a mobile device may also encompass or be applied to a stationary device or any other type of external device and vice versa. The external device may be another UAV. The external device may or may not have an antenna to aid in communications. For example, the external device may have a component that may aid in wireless communications. For example, direct wireless communications may include Wi-Fi, radio communications, Bluetooth, IR communications, or other types of direct communications.

In some cases, the datagram may be transmitted to the UAV by the communication module 201. The communication module may be provided on the control station. The communication module can be the same as the communication system 1114 described in FIG. 11. The communication module may be configured to enable an uplink data transmission between the UAV and the control station.

The communication module may be used for transmitting working data 205 from or to the UAV. In some embodiments, the working data 205 may comprise control, sensor data, telemetry data about the movable object, payload data or any data communicated between the UAV and the control station or other remote devices. For example, the communication module provided on the control station can provide control data to one or more of the UAV, carrier, and payload and receive information from one or more of the UAV, carrier, and payload (e.g., position and/or motion information of the UAV, carrier or payload; data sensed by the payload such as image data captured by a payload camera) as described in FIG. 11. In some instances, control data from the control station may include instructions for relative positions, movements, actuations, or controls of the UAV, carrier and/or payload. For example, the control data may result in a modification of the location and/or orientation of the UAV (e.g., via control of the propulsion mechanisms), or a movement of the payload with respect to the movable object (e.g., via control of the carrier). The control data from the control station may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some cases, the working data 205 may be transmitted from the UAV using the communication module provided on-board the UAV. The working data may include data collected by one or more sensors on-board the UAV, data for controlling the UAV, data related to state of the UAV or a component of the UAV, or any other types of data transmitted between the UAV and a remote device. In some instances, the working data from the movable object, carrier and/or payload may include data from one or more sensors. The communication channel may be used for transmitting airborne information such as videos or images. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. In some cases, the working data transmitted from the UAV may comprise control data configured to control another UAV such as control a state of one or more of another movable object carrier, or payload.

In some cases, the working data 205 may comprise information related to the communication channel or a data transmission mode. For instance, the working data may comprise various parameters, support for polling, encryption details, and information about capability of the network or the communication module and the like.

The communication module may transmit the working data using one or more communication channels. The one or more communication channels may use any suitable data transmission mode. In some cases, the data transmission mode specifies at least a communication protocol or standard, a data transmission unit structure or any other techniques that the one or more communication channels may be complied with. Different data transmission modes may require different hardware or software configurations. For instance, a first data transmission mode may refer to a Wi-Fi communication channel or the communication channel is under 802.11 standards, a second data transmission mode may refer to a software-defined radio (SDR) architecture and a third data transmission mode may refer to any other different techniques employed in wireless data transmission.

In some embodiments, the communication module may comprise a datagram generator 203 for generating a datagram 209 comprising the monitoring data 207. The datagram generator 203 may be part of the communication module. The datagram generator may be separate yet operably couple to the communication module. The datagram 209 may be configured such that the datagram can be transmitted using the existing data transmission mode without introducing additional components to the communication system or disrupting the working data transmission. The provided method or system may permit monitoring a movable object without alternating the current communication system of the movable object.

The datagram generator 203 may be configured to generate the datagram having a predetermined format. The datagram then can be transmitted using a data transmission unit. The predetermined format may be complied with the data structure of the data transmission unit. The data transmission unit may include one or more data transmission frames, one or more subframes, or any other types of data structures. The data transmission unit may have fixed length or variable length. The data transmission unit may have various data structures or data frame structures. In some cases, a datagram is transmitted using a single data transmission unit. In some cases, a datagram is transmitted using a plurality of data transmission units. For instance, a datagram may be subdivided into a plurality of sub-datagrams and each of the sub-datagrams may be transmitted using a data transmission unit. Alternatively, two or more of the sub-datagrams may be transmitted using a single data transmission unit. In some cases, the datagram generator may be implemented using one or more processors. The one or more processors may be comprised by the communication module, the UAV or the control station.

Figure 3:
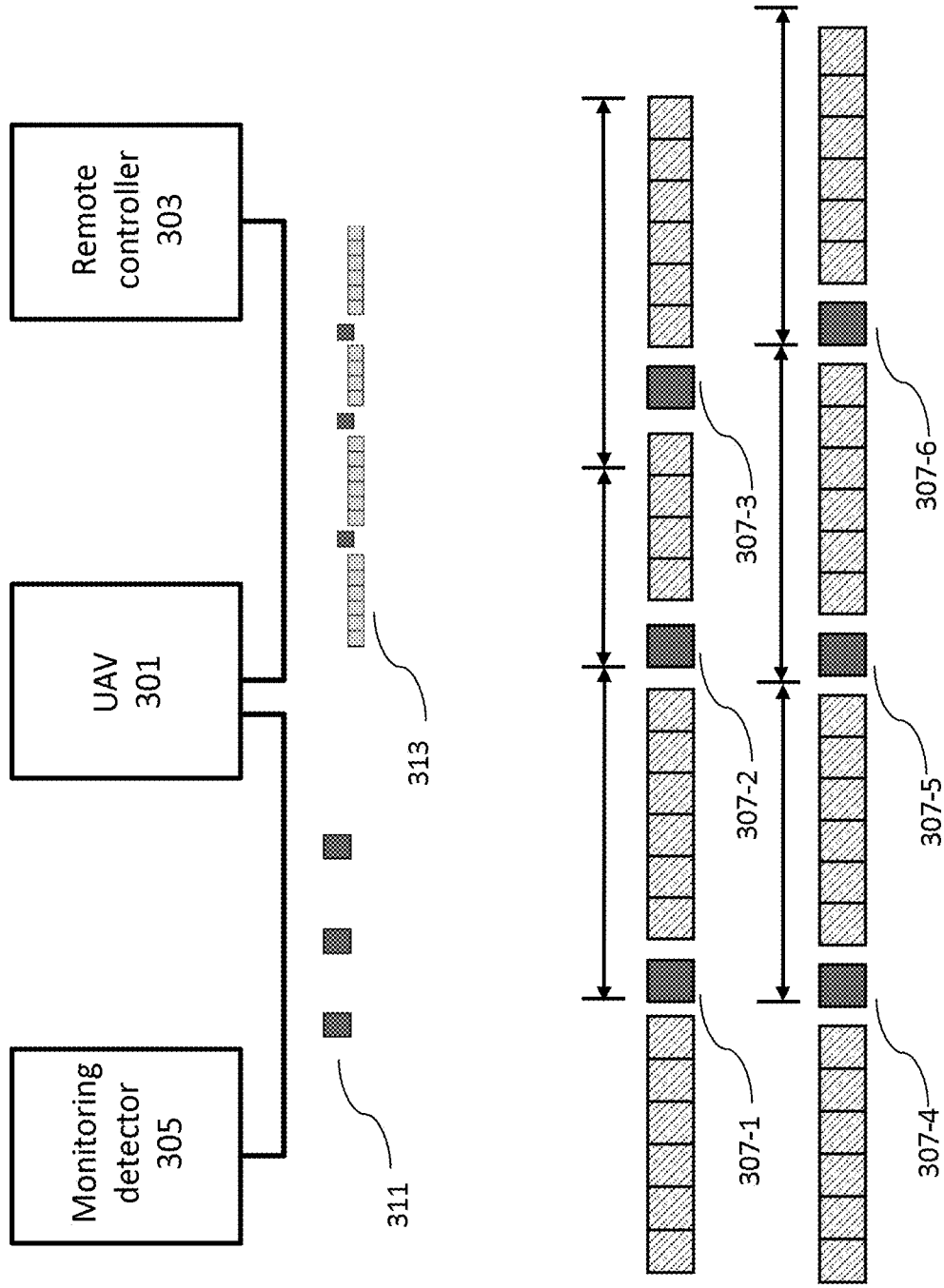
FIG. 3 schematically illustrates one or more datagrams transmitted along with working data from or to the UAV.

FIG. 3 schematically illustrates one or more datagrams 311 transmitted along with working data 313 from or to the UAV 301. The one or more datagrams 311 may be transmitted using one or more data transmission units. In some embodiments, the datagram 311 may be generated or transmitted cyclically or periodically. In some cases, the datagram may be generated or transmitted with fixed time intervals (e.g., datagrams 307-4, 307-5, 307-6). The datagram may be generated or transmitted at certain frequency that may or may not match the sampling rate of the location module. The datagram may comprise at least location data indicating a location of the UAV or a location of the control station. In some cases, the location data is the raw sensor data collected by the location module. In some cases, the location data may be processed sensor data. The datagram may be generated or transmitted at a frequency of at least, for example, 1 HZ, 10 HZ, 20 HZ, 50 HZ, 100 HZ, or 500 HZ. The frequency may or may not be known to one or more detectors configured to receive the datagrams. In other cases, the datagram may be generated or transmitted with variable time intervals (e.g., datagrams 307-1, 307-2, 307-3). For instance, when the transmission unit is a frame/subframe of a downlink or uplink of the UAV with variable intervals, the datagram may be transmitted at the corresponding variable intervals.

In some cases, the datagram may be generated or transmitted in a polling manner. The datagram may be generated and transmitted in response to a probe request generated by one or more detectors 305. For instance, the communication module may receive a probe request from a detector. The probe request may or may not specify SSID (service set identifier) field. The communication module of the movable object may continuously listen for the probe requests and if it finds the probe request, the communication module may provide a probe response frame to the detector. If an SSID is specified, only the movable objects with the same SSID may respond. If no specific SSID is specified, all of the movable objects receive the probe request may respond by sending a probe response frame. A datagram may be generated and transmit it to the detector using the probe response frame.

In some embodiments, the datagram 209 is inserted into a field of a data transmission unit and the rest of the data transmission unit may be used for transmitting at least a portion of the working data 313. In some cases, the working data or the portion of the working can be deciphered by the remote controller 303 but cannot be deciphered by the monitoring detector 305. The monitoring detector may not need to access the working data in order to decipher the datagram. For instance, the working data may be encrypted and the encryption information or wireless security information may be known to the remote controller but not the detector 305. In some cases, the datagram may not be encrypted. Alternatively, the datagram may be encrypted using a key known to the monitoring detectors such that the datagram can be decrypted by the one or more monitoring detectors. The datagram may or may not be deciphered by the remote controller.

In some cases, the datagram may be transmitted differently than the working data or the portion of working data in the same data transmission unit in at least one of the working frequency band, modulation schemes, coding schemes, data formats or communication protocols. For instance, when the portion of the working data comprises downlink data such as image or video data captured by one or more image sensors on-board the UAV, the image or video data may be encoded with a high-efficiency coding scheme whereas the datagram may be transmitted using a low efficiency coding scheme. In another instance, the datagram may be modulated using a low-order modulation scheme such as binary shift keying (BSK) or Gauss frequency-shift keying (GFSK) whereas the image or video data may be modulated using a high-order modulation scheme such as Quadrature Amplitude Modulation (QAM) or quadrature phase shift keying (QPSK). Alternatively, the datagram may be transmitted using the same transmission techniques as the portion of working data in the same data transmission unit. In another instance, the portion of the working data may comprise uplink data such as control data transmitted to the UAV. The uplink data may use a coding or modulation scheme such as binary shift keying (BSK), direct sequence spread spectrum (DSSS), frequency hopping spread spectrum, or Gauss frequency-shift keying (GFSK) that is different from the coding or modulation scheme used by the downlink data. Accordingly, the datagram transmitted with the uplink data may or may not be using the same coding or modulation scheme selected from the above methods. In some situations, using one or more predetermined coding schemes and/or modulation schemes such as described herein to transmit the datagram may provide robustness and reliability to the datagram transmission.

In some cases, the datagram may be transmitted using a coding or modulation scheme regardless of the coding or modulation schemes used for the working data. The datagram may be modulated or coded using a method regardless of the direction of data transmission. Various parameters, factors such as the coding or modulation scheme may be known to the one or more monitoring detectors such that the datagram can be demodulated or decoded using the corresponding method.

The datagram may be generated and transmitted according to an existing communication channel or data transmission mode. Various data transmission modes can be used to transmit the datagram. FIGS. 4-7 illustrate different examples of transmitting a datagram. Each example may be associated with a data transmission mode. It should be noted the provided method can be applied to any other data transmission modes that are used by a movable object.

In one aspect of the disclosure, a method for monitoring a movable object is provided. The method may comprise: obtaining a location of the movable object and/or a location of a remote controller in communication with the movable object; generating a datagram comprising data indicating at least one of: the location of the movable object or the location of a remote controller; and transmitting, with aid of one or more transmitters on-board the movable object, the datagram using a management frame.

In a separate yet related aspect, a system for monitoring a movable object is provided. The system may comprise: one or more sensors configured to obtain a location of the movable object and/or a location of a remote controller in communication with the movable object; one or more processors configured to generate a datagram comprising data indicating at least one of: the location of the movable object or the location of a remote controller; and one or more transmitters on-board the movable object, configured to transmit the datagram using a management frame.

Figure 4:
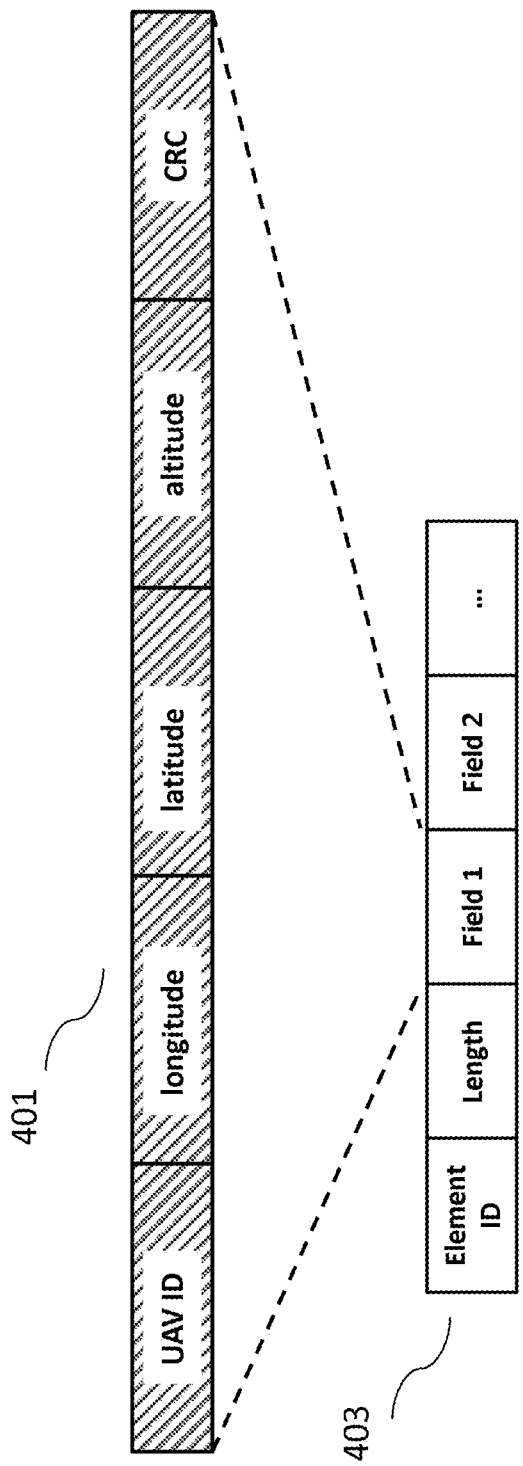
FIG. 4 illustrates an example of inserting a datagram into a field of a data transmission unit.

In some embodiments, the one or more sensors can be the same as the location modules as described elsewhere herein. The one or more processors can be the same as the datagram generator as described previously and the one or more transmitters may be comprised by a communication module or communication system of the movable object as described in connection with FIG. 11 or FIG. 2. FIG. 4 illustrates an example of inserting a datagram 401 into a field of a data transmission unit 403. In some embodiments, the data transmission unit may be a management frame.

In some embodiments, the communication channel provided between the movable object and the remote controller may be a Wi-Fi communication channel. As described elsewhere herein, the communication channel may be used for transmitting working data as well as the datagram. The communication channel may be under 802.11 standards or protocol. In some embodiments, the datagram may be embedded into a management frame. The 802.11 management frame may enable the movable object to establish and maintain communication with a remote device such as the control station or the detectors.

The management frame may be transmitted from the movable object under passive mode or active mode. In some cases, the management frame may be a broadcasting frame sent from the movable object. The management frame may carry working data related to at least a frequency channel for establishing or maintain a communication. For instance, the working data may include information related to SSID, data rates, and radio frequency channels of the access point. The radio frequency channel may be the channel used for transmitting the working data and the datagram. Several types of management frame may be used for transmitting the datagram, including but not limited to, beacon frame, probe request frame, and probe response frame. Other types of management frame such as association request frame, association response frame, acknowledgment frame and the like can also be used for transmitting the datagram.

The management frame may comprise different fields that may or may not be Information Elements (IEs). In some embodiments, the datagram 401 may be inserted into an Information Element (IE) field 403. For example, the datagram may be inserted into the "vendor specific" Information Element field of the beacon frame or the probe request frame. In the example as illustrated in the figure, the datagram may be carried by the information field of the IE. The information field may have variable length as indicated by the "Length" field of the IE. In some cases, the information field may be capable to carry the entire datagram. In other cases, the information field may be used to carry a portion of the datagram.

The datagram can be embedded into various other IEs or other fields of an IE. For example as shown in FIG. 4, a general structure of an IE may comprise an "Element ID" field and a "Length" field in addition to the information field as mentioned above. In some cases, the datagram can also be transmitted using the "Length" field. For example, the "Length" field of Power Constraint Information Element always contains value 1 thus leaving 7 free bits can be used to carry at least a portion of the datagram.

The method of transmitting the datagram can be applied to other types of management frames such as the probe request frame or the probe response frame. In some cases, a beacon frame may be broadcasted periodically such that the datagram may be transmitted periodically. The datagram may be transmitted at fixed intervals. For instance, the datagram may be transmitted with time interval of less than 10 seconds, 5 seconds, 1 second, 100 millisecond, 50 milliseconds, 10 milliseconds, or 1 millisecond. In some cases, the datagram may be transmitted at variable time intervals. In some cases, the datagram may be transmitted using a probe request frame sent from the movable object. The probe request may or may not contain an SSID value. In some cases, the probe request sent from the movable object to establish a communication channel. In some cases, the datagram may be transmitted using a probe response frame in response to receiving a probe request sent from a detector. For example, a detector may be configured to broadcast a probe request without specifying a SSID, and all the movable objects within a range of the detector hear the probe request may provide a probe response frame which includes the datagram.

As shown in the figure, the datagram 401 may comprise a monitoring data. The monitoring data may comprise at least a location of the movable object or a location of the remote controller. The datagram may also comprise an identifier of the movable object or an identifier of the remote controller. In some cases, the datagram may further include information related to transmission of the datagram such as a cyclic redundancy check (CRC) code. The datagram may have any length or size that the datagram may be transmitted using one or more IEs or one or more fields of the management frame. In some cases, the datagram may be divided into a plurality of sub-datagrams and each sub-datagram may be transmitted using one or more IEs of the management frame. In some cases, each sub-datagram may comprise a portion of the datagram and an index. The index may be used for integration of the sub-datagrams and reconstruct the datagram at a receiver end (e.g. detectors).

The communication channel may be configured to transmit working data as described elsewhere herein. In some cases, the working data may be encrypted using one or more encryption methods specified by the Wi-Fi standards. The working data need not be decrypted by the one or more detectors.

In some embodiments, the datagram transmitted using the management frame may not be encrypted. In some embodiments, the datagram may be encrypted and the encryption method may be known to the one or more detectors such that the datagram can be decrypted or deciphered by the one or more detectors. Various methods can be used to encrypt the datagram such as key-based encryption in which case the key may be known to the one or more detectors.

The movable object may not be limited to a UAV. The movable object can be any object that is capable of transmitting datagram from or to the object. The movable object may be an aerial vehicle, a land vehicle, a vehicle traversing water body, a mobile phone, a tablet, a laptop, a wearable device, or a digital camera.

In one aspect of the disclosure, a method for monitoring a movable object is provided. The method may comprise: obtaining a location of the movable object and/or a location of a remote controller in communication with the movable object; generating a datagram comprising data indicating at least one of: the location of the movable object or the location of a remote controller; and transmitting the datagram in one or more pre-determined time slots or one or more pre-determined frequency channels, wherein the datagram is transmitted along with working data for communication between the movable object and the remote controller.

In a separate yet related aspect, a system for monitoring a movable object is provided. The system may comprise:

one or more sensors configured to obtain a location of the movable object and/or a location of a remote controller in communication with the movable object; one or more processors configured to generate a datagram comprising data indicating at least one of: the location of the movable object or the location of the remote controller; and one or more transmitters on-board the movable object, configured to transmit the datagram in one or more pre-determined time slots or one or more pre-determined frequency channels, wherein the datagram is transmitted along with working data for communication between the movable object and the remote controller.

Figure 5:
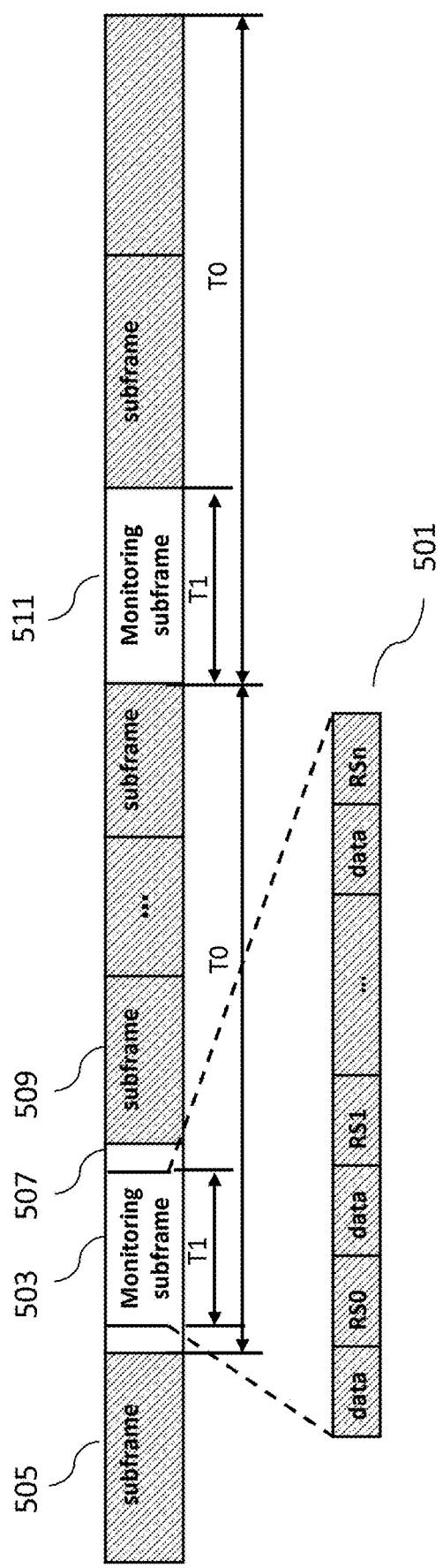
FIG. 5 illustrates an example of transmitting a datagram in one or more time slots or at different frequencies.

In some embodiments, the one or more sensors may be comprised by the location modules as described elsewhere herein. A datagram generator may be implemented using the one or more processors as described previously for generating the datagram, and the one or more transmitters may be comprised by a communication module or communication system of the movable object as described in connection with FIG. 11 or FIG. 2. FIG. 5 illustrates an example of transmitting a datagram 501 in one or more time slots or at different frequencies.

In some embodiments, the communication channel provided between the movable object and the remote controller may be enabled by software defined radio (SDR) techniques. As described elsewhere herein, the communication channel may be used for transmitting the datagram along with working data.

In some embodiments, the datagram may be transmitted using a subframe 503. The subframe may be transmitted in a time slot T1. Allocations of the subframe or scheduling of the subframe may be defined by the SDR techniques. It should be noted that any other types of data structures may be used to transmit the datagram in the time slot T1.

The datagram 501 may be transmitted cyclically or periodically. In some cases, the datagram may be transmitted with fixed time intervals T0. The time intervals may be configured such that it ensures sufficient duration of time slot T1 for transmitting the datagram. For example, a ratio of T0/T1 may be at least 5, 10, 50, 100, 200, 300, 400, 500, or 1000. The datagram may be transmitted with time interval of less than 10 seconds, 5 seconds, 1 second, 100 millisecond, 50 milliseconds, or 10 milliseconds. The subframe may be fixed-length. Alternatively, the subframe may have variable length.

In some embodiments, the monitoring subframe 503 and the neighboring subframes 505, 509 may be transmitted differently in at least one of the working frequency band, modulation scheme, data formats, duplexing means or communication protocols. The neighboring subframes may be used for transmitting at least a portion of working data. The neighboring subframes may be transmitted using the existing or current communication methods which need not be known to the one or more detectors. In some cases, there can be an inter-subframe guard interval 507 to ensure that distinct transmissions used for the monitoring subframe 503 and the subsequence subframe 509 do not interfere with each other. Similarly, a guard interval may be provided between the subframe 505 and the monitoring subframe 503. The guard intervals can be any length such as in a range from 100 µs to 300 µs. Given the specific need or configuration of the communication module, the guard intervals can be any length beyond the range. In some cases, two guard intervals may be provided that may or may not be the same length. In some cases, one guard interval may be provided depending on the transmission method used by the monitoring subframe and the neighboring subframe.

The datagram can be transmitted using different modes of the SDR. In some cases, the datagram may be transmitted in the time division duplex (TDD) mode. In some cases, the datagram may be transmitted in the frequency division duplex (FDD) mode.

In some embodiments, various factors related to transmitting the datagram may be specified by the SDR. The various factors may include, but not limited to, allocation of the monitoring subframe, scheduling of the time slots, frequency channels, modulation scheme, coding scheme and the like.

In some embodiments, the transmission of the datagram may utilize a frequency-hopping method. The frequency channel may keep changing according to a pseudorandom sequence known to both the transmitter and the receiver of the one or more detectors. Such a frequency-hopping mechanism can provide the datalink resistance against interference. Frequency hopping may occur at slot level or subframe level. For instance, the monitoring subframes 503 and 511 may be transmitted at different frequency channels.

A datagram may be transmitted by hopping over any number of frequency channels. For instance, for a 2.4 GHz band, the frequency channels 2414.5 MHz, 2429.5 MHz, 2444.5 MHz, 2459.5 MHz may be used. A sequence of datagrams may be transmitted using frequency hopping on at least 2 channels, 4 channels, 8 channels, 10 channels, 30 channels, or 50 channels.

In some embodiments, the frequency hopping may be performed over a predetermined pattern known to the one or more detectors. The predetermined pattern may define the hopping sequence over the multiple frequency channels. In some cases, the predetermined pattern may be associated with an identity of the movable object or a type of the movable object.

Various modulation schemes can be used for modulating the channel frequencies. In some cases, the datagram may be encoded using orthogonal frequency division multiplexing (OFDM) method. The OFDM method may be used for encoding the datagram on multiple frequency channels and each frequency channel may be modulated with other modulation scheme such as frequency-shift keying (FSK) or quadrature amplitude modulation (QAM).

As shown in FIG. 5, the datagram 501 may comprise a monitoring data. The monitoring data may comprise at least a location of the movable object or a location of the remote controller. The datagram may also comprise an identifier of the movable object or an identifier of the remote controller.

In some embodiments, the datagram may further comprise data for synchronization with one or more detectors. The datagram may comprise one or more reference symbols (RS0, RS1, . . . RSn) for synchronizing the transmitter and the receiver. The one or more reference symbols may be inserted among the data symbols. The format of the reference symbols and data symbols may be specified by the SDR. The detector can find the transmitter of the movable object by picking a random channel and listening for the reference symbols on that channel. The datagram may be identified by the special sequence of the reference symbols that is unlikely to occur over the segment of data for this channel and the segment can have a checksum for integrity and further identification. The transmitter and receiver may use fixed tables of the predetermined pattern or channel sequences so that once synchronized they can maintain communication by following the table. In some cases, the data symbol or the reference symbol may be modulated using a modulation scheme such as quadrature phase-shift keying (QPSK) or quadrature amplitude modulation (QAM). In some cases, the datagram may include information related to transmission of the datagram such as a cyclic redundancy check (CRC) code.

The datagram may have any length or size that the datagram may be transmitted using a single subframe. In some cases, the datagram may be divided into a plurality of sub-datagrams and each sub-datagram may be transmitted using one or more subframes. In some cases, each sub-datagram may comprise a portion of the datagram and a unique index for integration of the sub-datagrams at a receiver end (e.g. detectors).

In some embodiments, the datagram transmitted using the management frame may not be encrypted. For instance, the datagram can be assessed by one or more detectors without prior-knowledge about encryption. In some embodiments, the datagram may be encrypted and the encryption method may be known to the one or more detectors such that the datagram can be decrypted or deciphered by the one or more detectors. Various methods can be used to encrypt the datagram such as key-based encryption in which case the key may be known to the one or more detectors.

In another aspect of the disclosure, a method for monitoring a movable object is provided. The method may comprise: obtaining a location of the movable object and/or a location of a remote controller in communication with the movable object; generating a datagram comprising data indicating at least one of: the location of the movable object or the location of a remote controller, wherein the datagram comprises a plurality of sub-datagrams; and transmitting one or more of the plurality of sub-datagrams using a data transmission unit, wherein the data transmission unit comprises working data for communication between the movable object and the remote controller.

In a separate yet related aspect, a system for monitoring a movable object is provided. The system may comprise: one or more sensors configured to obtain a location of the movable object and/or a location of a remote controller in communication with the movable object; one or more processors configured to generate a datagram comprising data indicating at least one of: the location of the movable object or the location of the remote controller, wherein the datagram comprises a plurality of sub-datagrams; and one or more transmitters on-board the movable object, configured to transmit one or more of the plurality of sub-datagrams using a data transmission unit, wherein the data transmission unit comprises working data for communication between the movable object and the remote controller.

Figure 6:
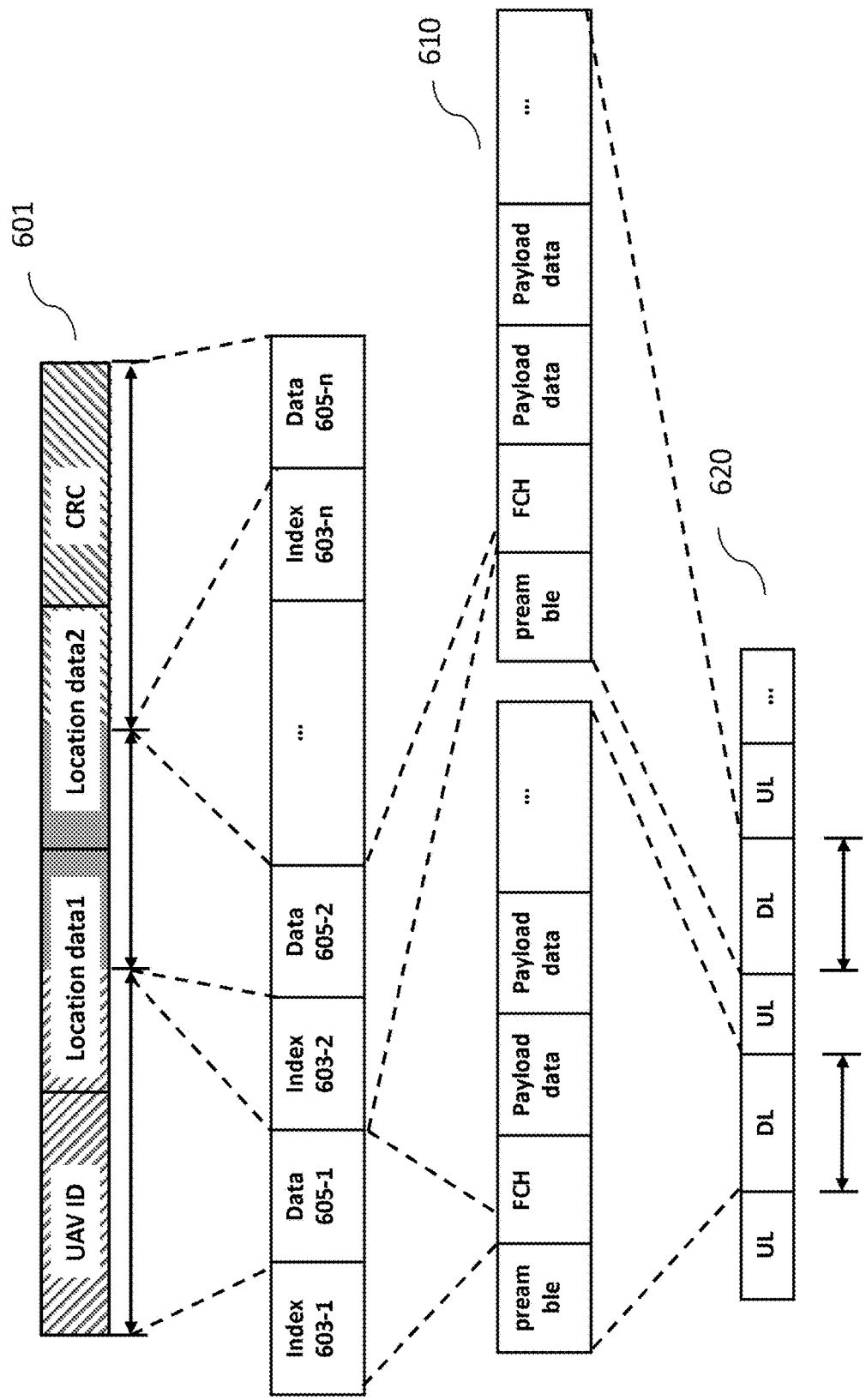
FIG. 6 illustrates an example of transmitting a datagram.
Figure 7:
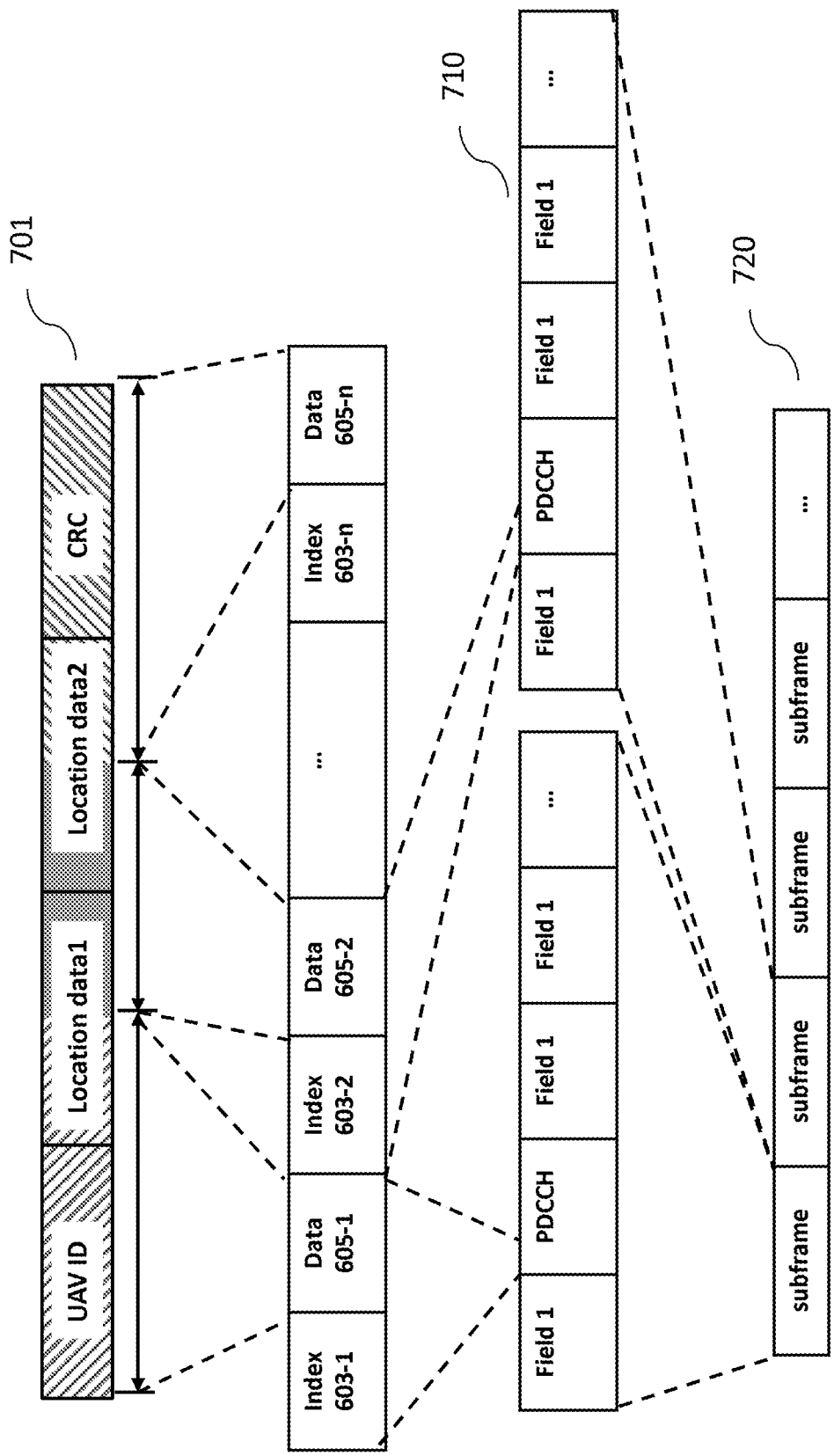
FIG. 7 illustrates an example of transmitting a datagram.

In some embodiments, the one or more sensors may be comprised by the location modules as described elsewhere herein. A datagram generator for generating the datagram as described previously may be implemented using the one or more processors, and the one or more transmitters may be comprised by a communication module or communication system of the movable object as described in connection with FIG. 11 or FIG. 2. FIGS. 6 and 7 illustrate examples of transmitting a datagram 601, 701 using exemplary data transmission units.

In some embodiments, the communication channel provided between the movable object and the remote controller may employ time division multiplexing (TDM) techniques or frequency division multiplexing (FDM) techniques. As described elsewhere herein, the communication channel may be used for transmitting the datagram along with working data.

In some embodiments, the datagram 601 or 701 may be divided into a plurality of sub-datagrams. The datagram may comprise a monitoring data. The monitoring data may comprise at least a location of the movable object or a location of the remote controller. The datagram may also comprise an identifier of the movable object or an identifier of the remote controller. In some cases, the datagram may include information related to transmission of the datagram such as a cyclic redundancy check (CRC) code.

In some cases, each sub-datagram may comprise an index (e.g., 603-1, 603-2, . . . 603-$n$) and a subset of the datagram (e.g., 605-1, 605-2, . . . 605-$n$). The sub-datagram may or may not have fixed length. Each sub-datagram can comprise any portion of subset of the datagram. For instance, a first sub-datagram may comprise an index 603-1 and data 605-1. Data 605-1 contains an identifier of the movable object and a portion of the location data of the movable object.

The index may indicate a sequence or order of the plurality of sub-datagrams such that one or more detectors may be able to reconstruct the datagram based on obtained sub-datagrams. In some cases, the one or more detectors may be configured to decipher the datagram using the index.

In some embodiments, the data transmission unit may be a subframe, accordingly a sub-datagram may be transmitted using a subframe. The subframe may be transmitted in a TDM mode or an FDM mode. It should be noted that any other types of data structures may be used to transmit the datagram.

Under the TDM communication mode, the time domain is divided into a plurality of cyclically repeating TDM frames 620. Each frame includes a plurality subframes 610. In some embodiments, all subframes within the frame have the same length. In some other embodiments, the subframes within the frame can have different lengths. In some cases, the TDM frames each have the same number of subframes and/or the same frame length. In other cases, the TDM frames can have variable number of subframes and/or variable frame lengths. Uplink data transmission can occur in some of the plurality of subframes (UL) or a first time slot, and downlink data transmission can occur in some of the other subframes (DL), or a second time slot. The uplink subframes (the first time slot) do not overlap in time with the downlink subframes (the second time slot). A frame can comprise one or more non-overlapping time slots.

The uplink data transmission and downlink data transmission may utilize different data transmission method such as coding schemes, modulation schemes, frequency, and the like. For example, the downlink data can be encoded using a high-efficiency coding scheme such as LDPC. Alternatively and/or additionally, the downlink data can be modulated using a multi-carrier and/or high-order modulation scheme. Examples of downlink modulation schemes can include QPSK, QAM, and the like. The downlink data is encoded and/or modulated using any one or more of QPSK, 16QAM, 64QAM, and 256QAM. The uplink data can be encoded and/or modulated using one or more predetermined coding schemes and/or modulation schemes such as described herein to provide robustness and reliability to the uplink data. For example, in an embodiment, the uplink data can be encoded/modulated using a combination of DSS, FHSS and GFSK techniques. Between two of consecutive subframes or at the end of a given subframe, there can be an inter-subframe guard interval to ensure that distinct transmissions do not interfere with each other. Similarly, between two consecutive frames or at the end of a given frame, there can be an inter-frame guard interval to avoid interference between transmissions.

In some embodiments, the sub-datagram may be inserted into a field of the subframe. For example, when the subframe is used for downlink data transmission, the sub-datagram may be inserted into a frame control header (FCH) of the downlink subframe 610. The FCH may have a fixed length. In some cases, the FCH or the sub-datagram may be modulated or coded using a low-order modulation or coding scheme such as quadrature amplitude modulation (BPSK, QPSK, 16-QAM, or 64-QAM). This may be beneficial to provide robustness and reliability to the datagram transmission.

Referring to FIG. 6, the plurality of sub-datagrams may be transmitted using a plurality of subframes. In some cases, the plurality of subframes may be used for downlink data transmission. The datagram may be transmitted with time interval of less than 100 millisecond, 50 milliseconds, 10 milliseconds, 5 milliseconds or 1 imilliseconds.

Referring to FIG. 7, under the FDM communication mode, a plurality of subframes may be transmitted simultaneously using multiple frequency channels or sub-carriers. The sub-datagram may be inserted into a field of a subframe 710. In some cases, the field may be a control channel of the subframe. For example, a sub-datagram may be inserted into the physical downlink control channel (PDCCH). The PDCCH may have a fixed length. In some cases, PDCCH or the sub-datagram may be modulated or coded using quadrature phase shift keying (QPSK). Various other control channels or fields such as Physical Control Format Indicator Channel (PCFICH) or Physical Control Format Indicator Channel (PCFICH) may also be used for transmitting the sub-datagram. In some embodiments, the datagram may not be encrypted. In some embodiments, the datagram may be encrypted and the encryption method may be known to the one or more detectors such that the datagram can be decrypted or deciphered by the one or more detectors. Various methods can be used to encrypt the datagram such as key-based encryption in which case the key may be known to the one or more detectors.

In one aspect of the disclosure, a method for assessing risk associated with a UAV is provided. The method may comprise: obtaining, using a detector, a datagram transmitted from or to the UAV when the UAV is within a range of the detector, wherein the datagram is transmitted along with working data for communication between the UAV and a control station; deciphering the datagram with aid of one or more processors to obtain a monitoring data about the UAV; and assessing a risk level associated with the UAV based on the monitoring data.

In a separate yet related aspect, a system for assessing risk associated with a UAV is provided. The system may comprise: a detector configured to obtain a datagram transmitted from or to the UAV when the UAV is within a range of the detector, wherein the datagram is transmitted along with working data for communication between the UAV and a control station; and one or more processors configured to decipher the datagram to obtain a monitoring data about the UAV; and assessing a risk level associated with the UAV based on the monitoring data.

In another related aspect, a tangible computer readable medium storing instructions that, when executed by one or more servers, causes the one or more servers to perform a computer-implemented method for assessing risk associated with a UAV is provided. The method comprises: obtaining a monitoring data from one or more detectors, wherein the monitoring data indicates at least on of: a location of the UAV and/or a location of a remote controller in communication with the UAV; and assessing a risk level associated with the UAV based on the monitoring data.

Figure 8:
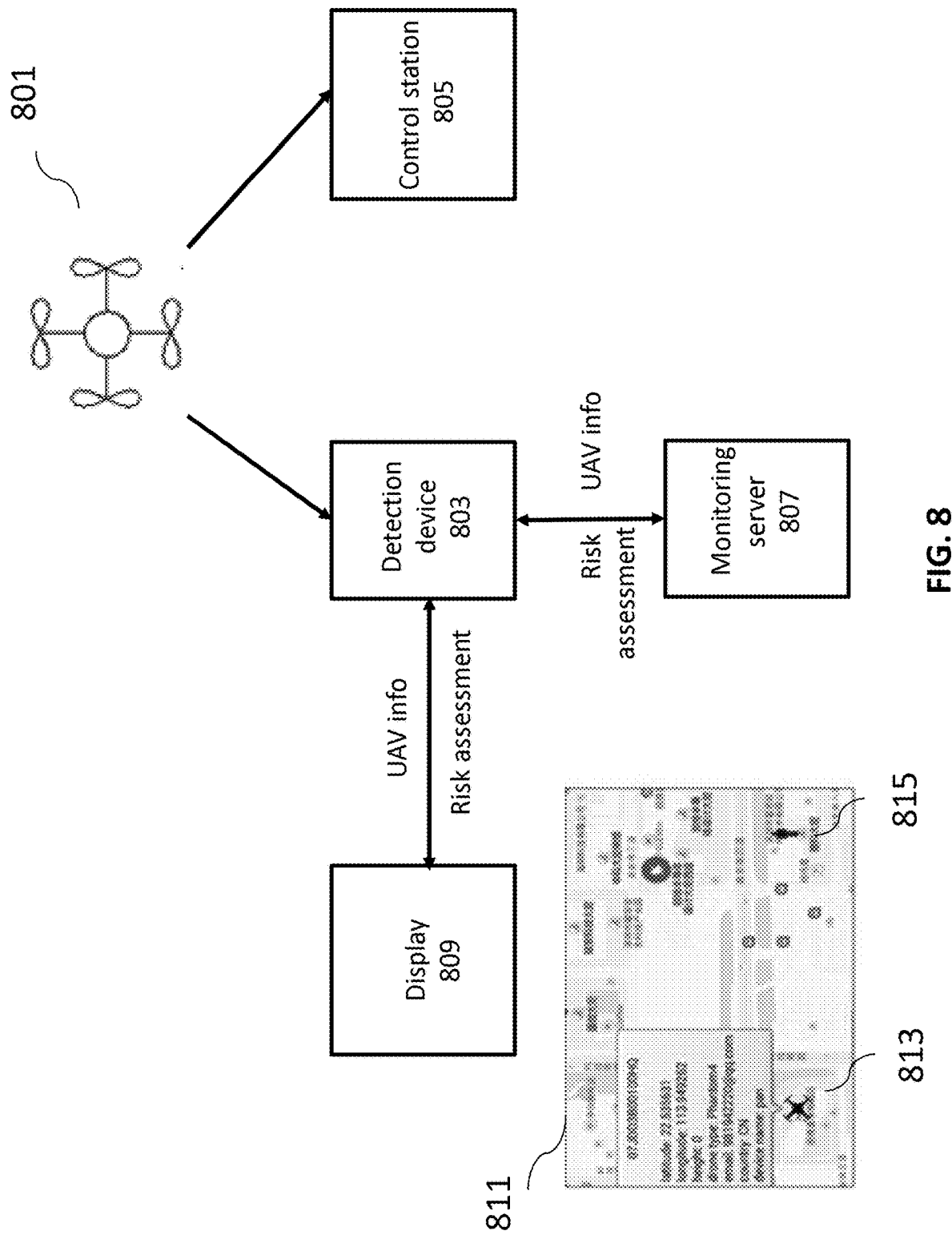
FIG. 8 schematically illustrates an example of assessing risk of a UAV.

FIG. 8 schematically illustrates an example of assessing risk of a UAV 801. In some embodiments, one or more detection device 803 may be deployed in a zone or region for monitoring one or more UAVs 801 within the zone or region. A risk associated with the UAV within the zone or region may be assessed.

Figure 12:
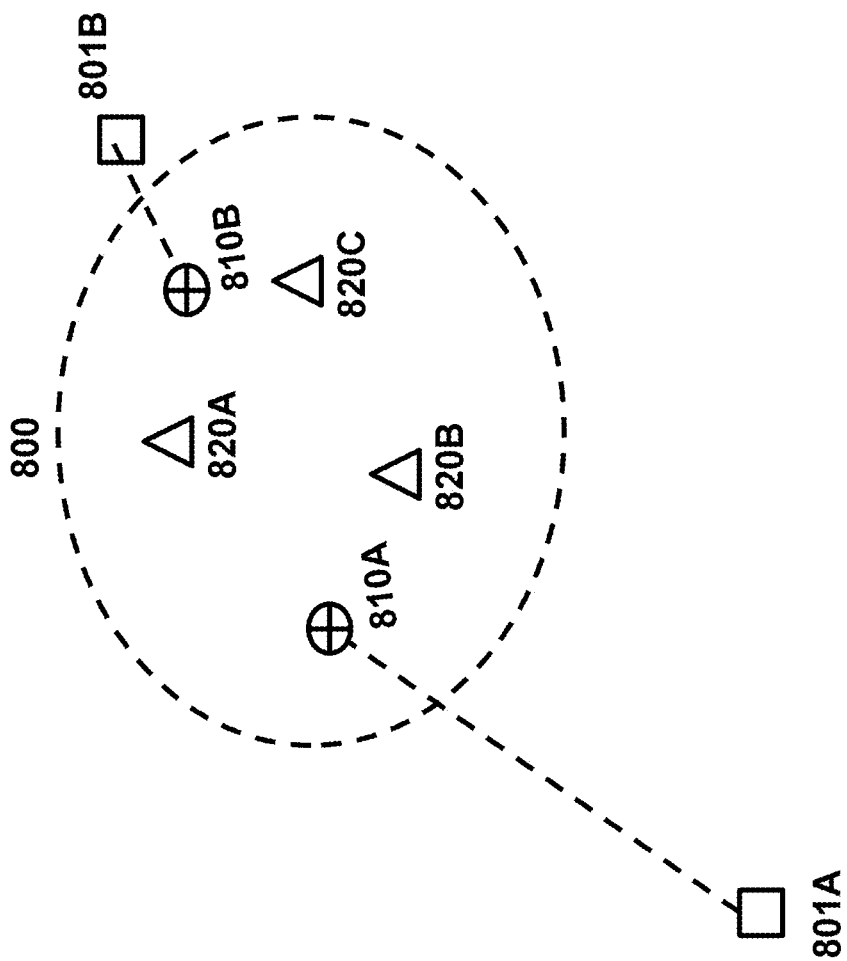
FIG. 12 shows an example of detection device locations, UAV locations and remote controller locations relative to the monitored area or zone.

A size of the zone or region monitored by the provided method may depend on the arrangement of the one or more detection devices. One or more UAVs within the zone or region can be monitored. One or more remote controllers in communication with the UAVs may or may not be within the zone or region. FIG. 12 shows an example of detection device 820A, 820B, 820C locations, UAV 810 A, 810B locations and remote controller 801A, 801B locations relative to the monitored area or zone 800. The zone or region may depend on existing wireless communications range of the one or more detectors 820A, 820B, 820C. The zone or region may have any shape or dimension. Various different shapes and dimensions (e.g., rounded shape, rectangular shape, triangular shape, irregular shapes, shape corresponding to one or more natural or man-made feature at the location, shape corresponding to one or more zoning rules, or any other boundaries) may depend on deployment of the one or more detectors. The zone or region may be determined by regulators or by private individuals. For example, the region or zone may be within a predetermined distance from a private residence, an airport, a public gathering place, government property, military property, a school, a power plant, or any other area that may be designated as a monitored zone. The monitored zone or region may include a space. The space may be a three-dimensional space that includes latitude, longitude, and/or altitude coordinates. The three-dimensional space may include length, width, and/or height. The region may include space from the ground up to any altitude above the ground. The zone or region may remain stationary over time, or may change over time. For instance, when the detection devices are portable, locations of the detection devices may change over time and accordingly the zone or area may change over time. Any zone or region can be monitored for UAV by the provided method and system.

Any number of detection devices 820A, 820B, 820C may be provided within the area. The detection device may comprise at least a detector as described elsewhere herein. In some cases, a detection device may refer to a detector. One, two, three, four, five, six, seven, eight, nine, ten or more detectors may be provided. A size of the area may be determined by the detection range of the detector and the deployment of detectors. The detection range of the detector may depend on the range over which a radio signal transmitted from the UAV can be received by the detector. The detector may have a detecting range of at least 1 km, 2 km, 3 km, or 5 km. In some instances, detectors may be distributed in an area with a density of at least 1 detector per square mile, 3 detectors per square mile, 5 detectors per square mile, 10 detectors per square mile, 15 detectors per square mile, 20 detectors per square mile, 30 detectors per square mile, 40 detectors per square mile, 50 detectors per square mile, 70 detectors per square mile, 100 detectors per square mile, 150 detectors per square mile, 200 detectors per square mile, 300 detectors per square mile, 500 detectors per square mile, or 1000 detectors per square mile.

The detectors may be distributed over a large area 800. For instance, the plurality of detectors may be distributed over an area greater than about 50 square meters, 100 square meters, 300 square meters, 500 square meters, 750 square meters, 1000 square meters, 1500 square meters, 2000 square meters, 3000 square meters, 5000 square meters, 7000 square meters, 10000 square meters, 15000 square meters, 20000 square meters or 50000 square meters. The detectors may be spread apart from one another. For example, at least two at least two of the plurality of detectors are located at least 1 meter away from one another, 5 meters away from one another, 10 meters away from one another, 20 meters away from one another, 30 meters away from one another, 50 meters away from one another, 75 meters away from one another, 100 meters away from one another, 150 meters away from one another, 200 meters away from one another, 300 meters away from one another, 500 meters away from one another, 750 meters away from one another, 1000 meters away from one another, 1250 meters away from one another, 1500 meters away from one another, 1750 meters away from one another, 2000 meters away from one another, 2500 meters away from one another, 3000 meters away from one another, 5000 meters away from one another, or 10000 meters away from one another.

In some embodiments, the plurality of the detectors (e.g., 820A, 820B, 820C) may be organized into zones to individually or collectively detect the UAV. In some instances, two or more detectors may be used to monitor a single UAV. For instance, datagrams transmitted from a UAV may be received by two or more detectors and the datagrams may collectively provide location information about the UAV such as a flight trajectory over a large area. Datagrams transmitted form a UAV may be received by two or more detectors simultaneously or at different time points. In some cases, a monitoring server may be configured to integrate the datagrams obtained by the plurality of detectors to provide comprehensive monitoring information about the UAV. For instance, a risk level associated with the UAV in the corresponding zones may be assessed based on the plurality of datagrams.

Alternatively, a single detector may be configured to monitor a plurality of UAVs by obtaining a plurality of datagrams transmitted from or to the plurality of UAVs. The plurality of datagrams may be obtained by the detector simultaneously or sequentially. For instance, when multiple UAVs are within a range of the detector, the detector may receive a plurality of datagrams transmitted from the UAVs thus monitor the UAVs simultaneously. The detector may be configured to scan one or more pre-determined frequency channels to receive the plurality of datagrams. The detector may receive the plurality of datagrams from different UAVs over a short period. The plurality of datagrams may or may not be transmitted using the same data transmission mode. In some cases, the plurality of datagrams may be transmitted using different data transmission modes concurrently or in different time slots.

In some embodiments, the detector may be a radiofrequency scanner. In some cases, the detector may comprise a single antenna. Alternatively, a detector may comprise multiple antennas. In some embodiments, the detection device may be portable. The detection device may have a weight no more than 5 kg, 4 kg, 3 kg, 2 kg, 1 kg, 500 mg, 200 mg, or 100 mg. In some embodiments, the detection device may have a footprint (which may refer to the lateral cross-sectional area encompassed by the detector) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, 5 $cm^2$, or 2 $cm^2$.

In some embodiments, the detection device (e.g., 820A, 820B, 820C) may be located remote to the remote controller or the control station 801A, 801B. The detection device may not be in direct communication with the remote controller or the control station. The remote controller or the control station may or may not locate within the monitored zone or area. The remote controller may or may not need to be in close proximity to the detection device to in order to be monitored. The remote controller can be any distance away from the monitored area or zone while its location can still be obtained by the detection device. For instance, the remote controller can be at least 20 miles, 10 miles, 8 miles, 5 miles, 4 miles, 3 miles, 2 miles, 1.5 miles, 1 mile, 0.75 miles, 0.5 miles, 0.3 miles, 0.2 miles, 0.1 miles, 100 yards, 50 yards, 20 yards, or 10 yards away from the one or more detection device and whereas the location of the remote controller can still be obtained by the detection device.

Referring to FIG. 8, the detection device may be configured to monitor one or more UAVs by obtaining and deciphering one or more datagrams transmitted from or to the UAV. In some embodiments, the detection device may be configured to scan one or more frequency channels to detect the datagram. In some cases, the one or more frequency channels are known to the detectors. In some cases, the detection device may be configured to obtain subsequent datagrams when a first datagram is detected. In some cases, the detection device may continue to listen on the same frequency channel for instance when the communication is Wi-Fi communication. In some cases, the detection device may continue to scan multiple predetermined frequency channels to obtain a sequence of datagrams transmitted using frequency hopping scheme as described elsewhere herein.

In some cases, the detection device may be able to determine subsequent monitoring actions based on obtained datagrams. For instance, a datagram may comprise information related to the transmission of the datagram such as allocation or scheduling of the datagram or reference symbols. The detection device may be configured to determine which frequency channels to continue to listen or the scheduling of obtaining subsequent datagrams according to such information.

In some instances, the detection device may be configured to select one or more UAVs to monitor based on the obtained datagrams. For instance, the detection device may receive a plurality of datagrams from a plurality of UAVs, the detection device may pick the UAV within certain proximity to continue to monitor. In some instances, the detection device may determine which UAV to continue to monitor based on a risk level provided by the monitoring server such that UAV with high risk level may be monitored. In other instances, the detection device may receive instructions from the monitoring server directly to selectively monitor one or more UAVs.

In some embodiments, the detection device may be configured to receive datagrams regardless of the data transmission mode of the communication channel between the UAV and the control station. The data transmission mode may be selected from a plurality of data transmission modes as described elsewhere herein. In some cases, the plurality of data transmission modes may be known to the detection device. The detection device may be configured to scan one or more frequency channels according to the one or more data transmission modes.

In some embodiments, the detection device may be configured to obtain the datagram by detecting a pre-determined data transmission unit. The data transmission unit may be a management frame, a monitoring subframe, a field of subframe or frame. The datagram or sub-datagrams may be detected by parsing the management frame, the monitoring subframe, the control field of a subframe or frame, or one or more reference symbols. The data transmission unit may or may not be encrypted. When the data transmission unit is encrypted, the encryption method such as the encryption key may be known to the detection device.

The obtained datagram may be decoded or deciphered using a corresponding decoding scheme or decryption method. The decoding or decryption method may be known to the detector. The decoding or decryption method may or may not be specified in the datagram.

In some embodiments, the one or more processors used for deciphering the datagram may be provided on a user device in communication with the detector. A user device may include a mobile device. A user device can include, among other things, desktop computers, laptops or notebook computers, mobile devices (e.g., smart phones, cell phones, personal digital assistants (PDAs), and tablets), and wearable devices (e.g., smartwatches). The datagram may be transmitted from the detector to the user device. In some cases, the detector may be wired to the user device. For instance, the detector may be connected to the user device via a USB connection. Additionally or alternatively, the detector may be in wireless communication with the user device.

Figure 13:
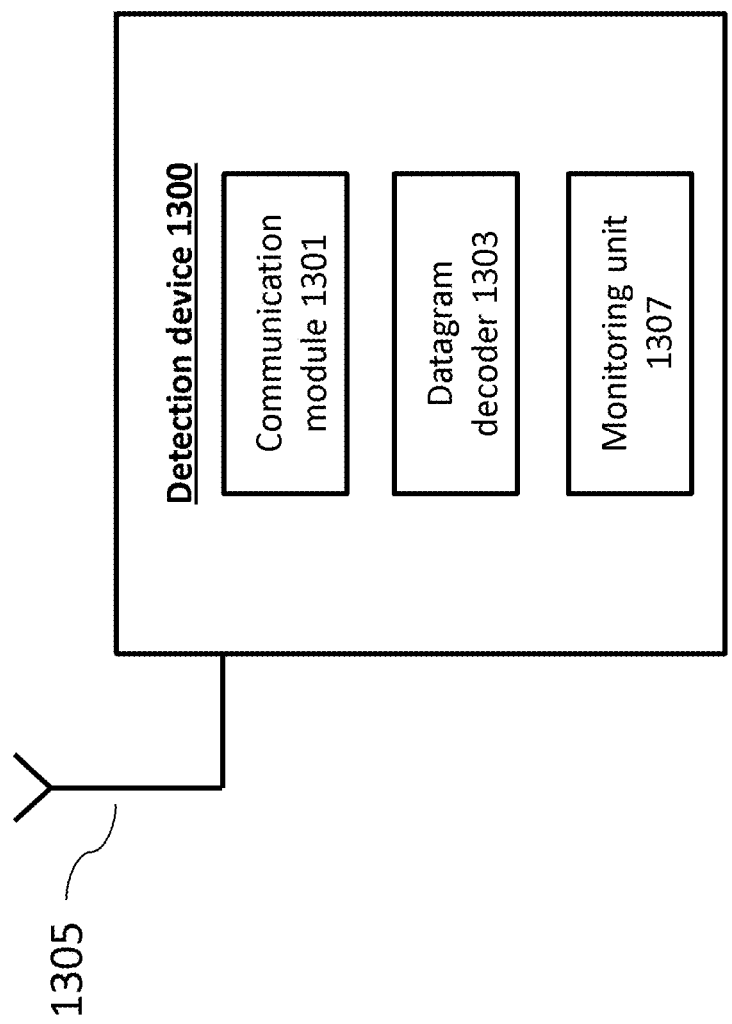
FIG. 13 shows a block diagram of an exemplary detection device.

In some embodiments, the one or more processors used for deciphering the datagram and the detector may be on-board the same detection device 803. FIG. 13 shows a block diagram of an exemplary detection device 1300. The detection device can be the same as the detection device as described in FIG. 1 or FIG. 8. The detection device 1300 may comprise one or more antennas 1305 configured to received one or more datagrams. The detection device may comprise one or more communication modules 1301. The one or more communication modules may enable a communication between the detection device and a remote device. The remote device may include at least a monitoring server. The remote device may further include a user device (e.g., mobile phone) or a display device. The one or more antennas 1305 may be a component of the communication modules. Alternatively, the one or more antennas may be separate from the communication modules. The obtained datagrams may be decoded by one or more datagram decoders 1303 onboard the detection device. The output of the datagram decoder may be the monitoring data coded in the datagram. In some cases, the one or more datagram decoders may be a component of the communication module 1301. In some cases, the detection device may further comprise a monitoring unit 1307. The monitoring unit may be configured to select one or more UAVs to continue to monitor based on obtained datagrams.

In some cases, the detection device 1300 may comprise a single antenna 1305. Alternatively, a detector may comprise multiple antennas 1305. The one or more antennas may allow the detection device to receive a plurality of datagrams simultaneously or sequentially. For instance, when multiple UAVs are within a range of the detection device, the detection device may receive a plurality of datagrams transmitted from the UAVs concurrently thus monitor the UAVs simultaneously. The detection device may be configured to scan one or more pre-determined frequency channels to receive the plurality of datagrams. The detection device may receive the plurality of datagrams from different UAVs over a short period. The plurality of datagrams may or may not be transmitted using the same data transmission mode. In some cases, the plurality of datagrams may be transmitted using different data transmission modes concurrently or in different time slots.

The communication module 1301 may be onboard the detection device. In some cases, the communication module 1301 may enable communication with a remote device (e.g., monitoring server, user device) via wireless signals. The communication module 1301 may include any number of transmitters, receivers, and/or transceivers suitable for wireless communication. The communication may be one-way communication, such that data can be transmitted in only one direction. For example, one-way communication may involve only the detection device transmitting monitoring data to the remote device, or vice-versa. The data may be transmitted from one or more transmitters of the communication module 1301 to one or more receivers of the remote server, or vice-versa. Alternatively, the communication may be two-way communication, such that data can be transmitted in both directions between the detection device 1300 and the remote device. The two-way communication can involve transmitting data from one or more transmitters of the communication module 1301 to one or more receivers of the remote device, and vice-versa. Any communication technologies as described elsewhere herein can be applied to the communication module 1301. The data transmitted between the detection device and the remote server or user device has been discussed elsewhere herein.

In some cases, the detection device may comprise a datagram decoder 1303. The datagram decoder may include one or more decoders. The datagram decoder may be configured to decode the obtained datagram using a corresponding decoding scheme. The datagram decode may decode or decipher the obtained datagram and obtain the monitoring data. In the case that the datagram is encrypted, the associated decryption method may also be known to the decoders thus the encrypted datagram can be decrypted by the decoders. The decoding or decryption method may be known to the decoders. The decoding or decryption method may or may not be specified in the datagram. In an example, the datagram may comprise a plurality of reference symbols and the datagram is deciphered by detection of the reference symbols. The datagram decoder 1303 may not decode the working data transmitted along with the datagram. In some cases, at least a portion of the working data are not decoded or deciphered by the datagram decoder. The decoded or deciphered monitoring data may be transmitted to the remote device via the communication module.

In some embodiments, the detection device 1300 may further comprise a monitoring unit 1307. The monitoring unit may be configured to select one or more UAVs to monitor based on the obtained datagrams. For instance, based on the location data decoded from a plurality of datagrams from a plurality of UAVs, the monitoring unit 1307 may select the UAV within certain proximity to continue to monitor. In some instances, the monitoring unit 1307 may determine which UAV to continue to monitor based on a risk level provided by the monitoring server such that UAV with high risk level may be monitored. In other instances, the detection device may receive instructions from the monitoring server directly to selectively monitor one or more UAVs.

In some embodiments, the detection device 1300 may be portable. In some cases, the detection device may be wired to a user device (e.g., mobile device). For example, the wired connection is a USB connection between the detection device and the mobile device. The detection device may have a weight no more than 5 kg, 4 kg, 3 kg, 2 kg, 1 kg, 500 mg, 200 mg, or 100 mg. In some embodiments, the detection device may have a footprint (which may refer to the lateral cross-sectional area encompassed by the detector) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, 5 $cm^2$, or 2 $cm^2$.

The monitoring unit 1307 and the datagram decoder 1303 can be implemented using one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. In some cases, the one or more processors may be located in the housing of the detection device 1300.

Referring back to FIG. 8, a risk level associated with the monitored UAV may be assessed. A risk associated with a UAV may be classified into a number of risk levels. Any number of levels may be used such as two, three, four, five, six, and the like. In some instances, the level of risk may be substantially continuous or may have a very large number of categories. For example, the risk level may be quantitative.

In some embodiments, the risk level associated with a monitored UAV may be assessed based on information retrieved from a database. The database can be the same database 109 as described in FIG. 1. The database may be accessible to a monitoring server 807. In some embodiments, the information stored in the database may be related to an owner of the UAV, purchase time, and purchase site of the UAV. Other information related to the UAV or the owner of the UAV may also be stored in the database. For instance, historic data such as records or reports malicious or fraud-related conduct of the UAV or the owner of the UAV may also be retrieved from the database and can be used for assessing the risk level. Information pertaining to a UAV may be stored and retrieved according to the UAV identifier. For instance, the UAV identifier deciphered form the datagram by the detector may be transmitted to the monitoring server for retrieving the additional information pertaining to the UAV. In some cases, a predetermined risk level associated with a UAV may be pre-stored in the database and the risk level may be retrieved according to the UAV identifier.

In some cases, the information may be retrieved from the database using the UAV identifier, the remote controller identifier or the user identifier provided by the datagram. For instance, after a datagram is deciphered by the detector or the one or more processors coupled to the detector, the UAV identifier may be obtained and information stored in the database associated with the UAV identifier may be retrieved or accessed. Similarly, the user identifier or the remote controller identifier may be used to retrieve information associated with the user or owner of the UAV and the information about the remote controller such as type or records.

In some embodiments the risk level may be assessed based on a distance between the UAV and the one or more detectors. For example, if a distance remains beneath a predetermined value, no indication of risk may be provided. If the distance exceeds the predetermined value, an indication of risk of hijacking or malfunction may be provided. Conversely, if a distance remains above a predetermined value, no indication of risk may be provided. If the distance falls below the predetermined value, an indication of risk of hijacking or malfunction may be provided. In other instances, if the distance meets or exceeds a first threshold, a high level of risk may be indicated. If the distance falls between the first threshold and a lower second threshold, a moderate level of risk may be indicated. If the distance falls beneath the second threshold, a low level of risk may be indicated. In some instances, a risk percentage may be provided based on the distance.

In some embodiments the risk level may be assessed based on a flight trajectory of the UAV. The flight trajectory may be generated based on a sequence of the monitoring data associated with the UAV. The sequence of monitoring data may provide a sequence locations or trajectory of the UAV. In some cases, based on the trajectory, moving speed, direction may be used to assess the risk level associated with the UAV.

Various other factors may be taken into account to assess the risk level of the UAV. For instance, a higher number of detectors receiving the radio signal from the UAV may indicate a higher risk level associated with the UAV. For example, the risk level associated with the UAV may be assessed based on the number of detectors that have provided monitoring data associated with the same UAV. In another instance, the risk level of the UAV may be associated with a type of the UAV.

The risk level may be determined based on one or more of the factors as mentioned above. The one or more factors may be collectively used to determine the risk level. The risk level may be static. The risk level may change over time. The one or more factors may or may not be weighted in order to determine the risk level.

In some embodiments, a risk level associated with the corresponding monitored zone or area may also be assessed. In some instances, the risk level associated with the monitored zone or area may be determined based on the number of UAVs detected within the zone or the number of UAVs with high risk detected in the zone.

In some embodiments, the risk level may be assessed or determined by a risk assessment system. The risk assessment system may be configured to search, retrieve, and analyze the risk level associated with one or more monitored UAVs. The risk assessment system may receive monitoring data provided by the one or more detectors and determine a risk level associated with the UAV identified provided by the monitoring data. The risk assessment system may be in communication with one or more detectors. In some cases, the risk assessment system may receive information about the UAV for retrieving additional information from the database. In some instances, the information about the UAV may include at least one of the UAV identifier, user identifier or remote controller identifier.

The risk assessment system may be implemented using any hardware configuration or set up known or later developed in the art. For instance, the risk assessment system may be individually or collectively operated using one or more servers 807. A server may include a web server, an enterprise server, or any other type of computer server, and can be computer programmed to accept requests (e.g., HTTP, or other protocols that can initiate data transmission) from a computing device (e.g., a mobile device) and to serve the mobile device with requested data (e.g., monitoring data about UAVs within a zone). In addition, a server can be a broadcasting facility, such as free-to-air, cable, satellite, and other broadcasting facility, for distributing data. A server may also be a server in a data network (e.g., a cloud computing network). Any description of servers may apply to any other type of device. The device may be a computer (e.g., personal computer, laptop computer, server), mobile device (e.g., smartphone, cellular phone, tablet, personal digital assistant), or any other type of device. The device may be a network device capable of communicating over a network. The device comprises one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein.

In some embodiments, the monitoring server 807 may be further configured to control one or more operational state of the one or more detectors. In some instances, the monitoring server may generate instructions to control the one or more detectors based on the information about the operational state. For example, the instructions may include enabling or disabling the one or more detectors, setting one or more parameters of the one or more detectors. In some instances, the monitoring server may update a firmware, a software, or a configuration on the detection device. In some instances, based on a risk assessment result, the server may or may not provide instructions to the detector to selectively monitor one or more UAVs.

In some embodiments, the risk assessment or information about the UAV may be displayed on a display device 809. The display device may include a screen or other type of display. The screen may be an LCD screen, CRT screen, plasma screen, LED screen, touchscreen, and/or may use any other technique to display information known or displayed later in the art. The display device may be operably coupled to the one or more detectors or detection devices. In some cases, the display device can be the mobile device coupled to the detector or detection device.

In some cases, at least one of the information about the UAV, the risk assessment about the UAV, or a risk assessment about the monitored zone or area may be displayed on the display device. In some instances, the information may be presented in a graphical format 811. For example, a map may be provided showing the monitored zone or area. The map may show the zone or area monitored by the one or more detectors at the current point in time. In some cases, a marker visually portrayed on the map may be used to show the location of the UAV 813 and/or the remote controller 815. The marker can by any graphical or visual representation that may include letters, numbers, icons, shapes, symbols, pictures, or any other type of image. The marker may be dynamic and the location of the marker on the map may change over time.

In some cases, information pertaining to a UAV flight trajectory may be displayed on the user interface. The flight trajectory may be generated based on the location information provided by the datagrams. For example a dotted line or other indicator of a path may show where the UAV has already traveled. A map may display a line or other indicator of the path that the UAV has already traversed. Additionally or alternatively, information about the location of the UAV and/or the remote controller can be displayed in any other suitable formats such as text or numbers.

In some cases, information about the UAV such as UAV type, UAV ID, remote controller ID, owner identity, record or report related to the UAV or the owner, and other information directly provided by the datagram or retrieved from the monitoring server may be displayed on the display screen. In some cases, the risk level associated with the UAV may be displayed on the screen. The risk level may be presented by means of text information shown on the display or by graphical representations. In some instances, the risk level associated with a UAV may be shown by the marker. In some instances, color code may be used to indicate a UAV with certain risk level. For example, a red UAV marker may be indicative of high risk. In some cases, an alert may be presented to a user when a high risk level is determined in association with a UAV. It should be noted that only one UAV is shown in the figure, however any number of monitored UAVs can be shown on the map or on the display screen.

In some cases, the graphical display may be a graphical user interface that may allow a user to input commands or interact with the displayed information. For example, a user may be allowed to select one or more UAVs to be displayed on the display device. A user may be allowed to view more information about the UAV by selecting the UAV. A selection of a UAV to be displayed on the display device may or may not affect monitoring of the UAV. In some cases, a user selection of a particular UAV may cause one or more detectors to monitor the selected UAV only. In some cases, a user selection of a particular UAV may not influence the monitoring of the UAV by the detectors.

In another aspect of the disclosure, a method of monitoring and regulating a UAV is provided. The method comprises: assessing a monitoring state of the UAV, wherein the monitoring state is assessed based at least in part on a status of a location module, validity of location data or a status of a monitoring communication module; transmitting a datagram comprising monitoring data indicating at least one of: a location of the UAV and a location of a remote controller in communication with the UAV when the monitoring state is assessed to be valid; and determining a set of regulation rules when the monitoring state is assessed to be invalid.

In a separate yet related aspect, a system of monitoring and regulating a UAV is provided. The system comprises: one or more processors configured to: assess a monitoring state of the UAV, wherein the monitoring state is assessed based at least in part on a status of a location module, validity of location data or a status of a monitoring communication module; determine a set of regulation rules when the monitoring state is assessed to be invalid; or instruct the monitoring communication module to transmit a datagram comprising monitoring data indicating at least one of: a location of the UAV or a location of a remote controller in communication with the UAV when the monitoring state is assessed to be valid.

Figure 9:
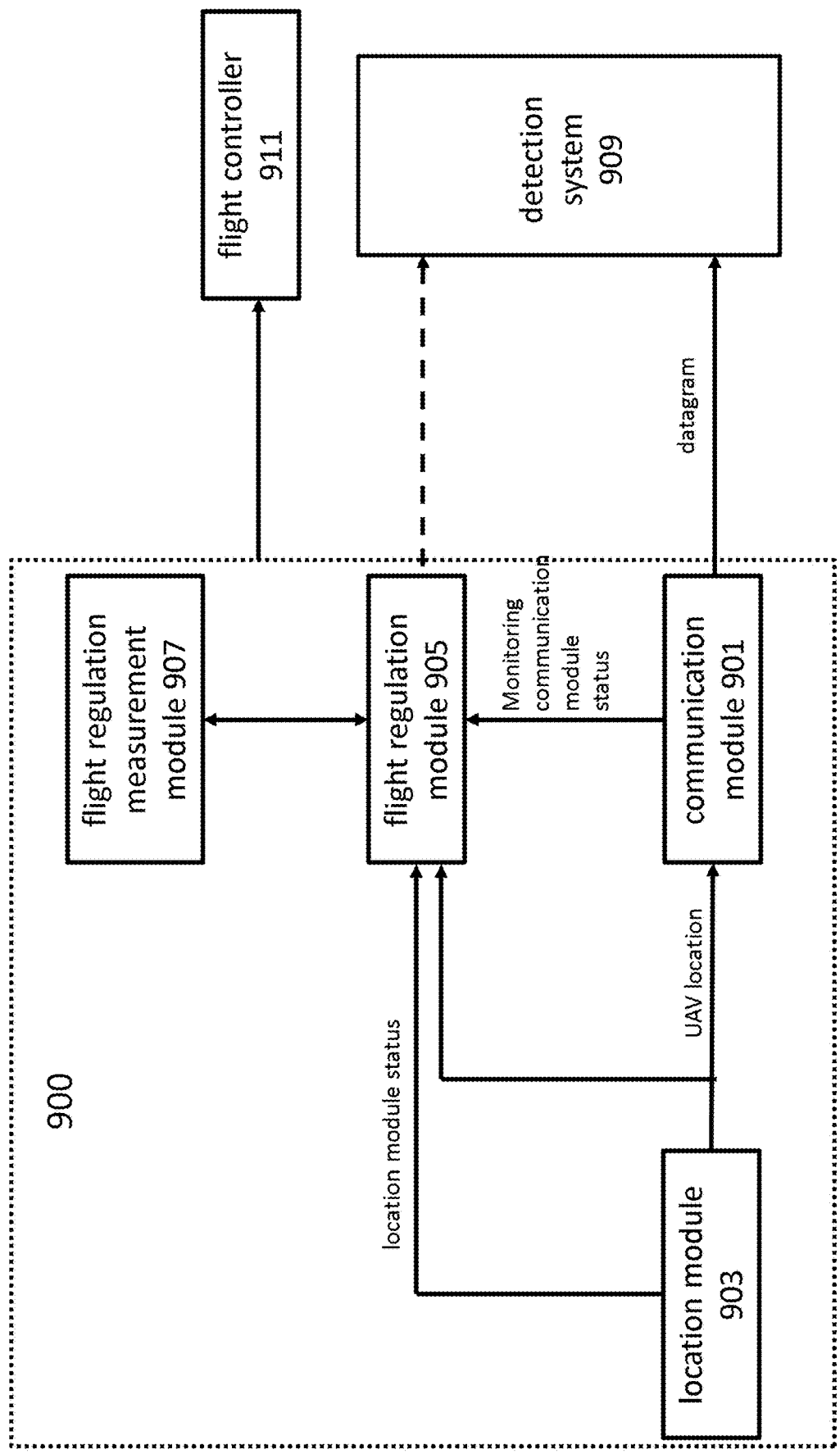
FIG. 9 shows a blog diagram of a monitoring and regulating system, in accordance with embodiments of the disclosure.

FIG. 9 shows a block diagram of a monitoring and regulating system 900, in accordance with embodiments of the disclosure. The monitoring and regulating system may be provided for monitoring one or more UAVs within a zone or area and regulating flight of the UAV when monitoring fails. The system and method may be useful to ensure that a UAV can be properly regulated even when the monitoring fails such that a risk posed by the UAV can be minimized. In some embodiments, the system 900 may comprise a communication module 901 for transmitting one or more datagrams comprising monitoring data and the datagrams may be received by a detection system 909. The system may further comprise a location module 903 for obtaining real-time location of the UAV, a flight regulation module 905 for determining a regulation strategy and a flight regulation measurement module 907 for generating one or more flight control parameters for regulating flight of the UAV. In some embodiments, the system may be provided on-board the UAV.

In some embodiments, the communication module 901 can be the same as the communication module or communication system as described elsewhere herein. The communication module may transmit one or more datagrams when the monitoring state of the UAV is valid. The one or more datagrams may be received and deciphered by a detection system. The detection system 909 may comprise one or more detectors or detection devices as described elsewhere herein. The location module 903 can be the same as the location module as described elsewhere herein. In some embodiments, a monitoring state of the UAV may be assessed by the flight regulation module 905. The monitoring state may be assessed based on one or more factors. In some cases, the monitoring state may be assessed to be valid or invalid. The monitoring state may be assessed to be invalid when one of the factors is invalid. The monitoring state may be assessed to be invalid when two or more of the factors are invalid. In some cases, the monitoring state may be assessed to be invalid based at least in part on a status of a location module, validity of location data or a status of a monitoring communication module.

In some embodiments, the flight regulation module 905 may be configured to constantly assessing a status of the location module. In some cases, the status of the location module may be assessed to be valid or not. In some cases, the status of the location module may be assessed based on an operational state of the location module. A valid status of the location module may indicate that the location module functions properly. For example, if the location module malfunctions or powered-off, the status may be assessed to be invalid.

In some embodiments, the flight regulation module 905 may be configured to assess validity of the location data collected by the location module. The location data may include the location of the UAV. Various factors may be checked to determine whether the location data is valid. For example, when a global navigation satellite system (GNSS) is used as the location module, the location data may be determined to be valid based on a signal-to-noise ratio (SNR) of the GNSS signal. In some instances, when the signal-noise ratio is below certain threshold, the location data may be determined to be invalid. Other factors such as number of satellites, signal strength and the like that may affect quality or accuracy of the location data may also be taken into consideration when determining the validity of the location data.

In some embodiments, the flight regulation module 905 may be configured to assess a status of the communications module. The status of the communication module may be assessed to be valid or not based on one or more channel characteristics. In some cases, the one or more channel characteristics may include noise, interference, signal-to-noise ratio, bit error rate, fading rate or bandwidth. In some instances, a status of the communication module may be determined to be valid when the one or more of the noise, interference, signal-to-noise ratio, bit error rate, fading rate or bandwidth are measured or detected to be within certain range. The range may be the range that data transmitted under such condition are reliable or valid. For instance, when the noise is above certain threshold that the quality of the data is tampered, the status of the communication channel may be determined to be invalid.

In some embodiments, when the monitoring state of a UAV is determined to be invalid, the UAV may enter a flight regulation mode. The UAV may be regulated under a regulation strategy determined by the flight regulation module. In some embodiments, the regulation strategy may include a set of regulation rules. The set of regulation rules may be used to regulate at least one of the altitude or height of the UAV, flight distance and flight time. For instance, distance of the UAV flight may be regulated, e.g. it has to be within certain distance from the remote controller. If the distance exceeds the distance limit, the UAV may be forced to land, to hover, or to return to its starting point. In another instance, the flight time may be regulated, e.g., when the time duration after a UAV has been powered-on exceeds certain threshold, the UAV may be forced to land, to hover, or to return to its starting point. In a further instance, a height or altitude of the UAV may be regulated, e.g., it has to be within certain height range otherwise the UAV may be forced to land, to hover, or to return to its starting point. Other rules may also be applied to regulate one or more flight capabilities of the UAV such as speed, functions of the UAV such as communication function, or equipment function (such as a camera or other type of payload) carried by the UAV may be required to suspend operations temporarily.

The regulation strategy or the set of regulation rules may include any of the rules as described above. In some embodiments, the flight regulation module may determine the regulation strategy according to the monitoring state of the UAV or the one or more factors that are used to determine the monitoring state of the UAV. For example, if the status of the communication module is invalid whereas status of the location module and location data are valid, regulation rules for regulating the flight distance and/or flight time may be applied. In another example, if the status of the communication module is invalid and whereas status of the location module and the location data are valid, flight distance, flight time or attitude regulation may be applied. In another example, if none of the communication module, location data or the location module is valid, flight time regulation or flight distance regulation may be applied. In another example, if the location data and the location module are invalid whereas the communication module is valid, flight distance and/or flight time regulation rules may be applied. Various combinations of the set of regulation rules may be determined which should not be limited by the examples described above.

In some embodiments, the flight distance regulation rule may require measurement of a distance between the UAV and the remote controller. In some cases, the flight distance regulation rule may be performed even when none of the communication module, location data or the location module is valid. Different methods may be used to measure the distance. In some instances, the distance may be measured based on GPS location of the UAV and the location of the remote controller. Location of the remote controller and location of the UAV can be obtained using any method as described elsewhere herein. This method may be used when the status of location module and the location data are valid. In some instances, the distance may be measured based on a wireless signal strength. For example, a strength of the radio signal received by a receiver of the communication module or a receiver on-board the UAV may be used to determine the distance. The distance can be calculated based on a power attenuation relationship represented by below equation:

$$p_{rsrp} = p_{tx} + h_{txrx} - 32.5 - 20 \log_{10} f - 20 \log_{10} D - X$$

where $P_{tx}$ represents the transmit power of the transmitter, $h_{txrx}$ represents the antenna gain, f represents the carrier frequency and X represents the shadow fading item. Given the above equation, the distance D can be calculated when the received power is measured (X=10 dB)

$$D = 10^{\frac{p_{tx}+h_{txrx}-32.5-20log_{10}f-p_{rsrp}}{20}}$$

Alternatively, the signal can be the radio signal received by a receiver on the remote controller. This method may be used when the location module or the location data are not valid. In other instances, the distance may be obtained based on a wireless signal round-trip delay between the UAV and the remote controller. For instance, the distance may be calculated when the round trip time (RTT) is measured using below equation:

$$D=c*RTT/2$$

where c represents speed of light and the distance can be calculated once the RTT is measured. This method may be used when none of the location module, the location data or the communication module is valid.

A flight regulation measurement module 907 may be used to measure the one or more regulation parameters (e.g., flight distance, height, flight time). The flight regulation measurement module may measure one or more of the regulation parameters according to the selected regulation rules or strategy. For instance, if the flight distance rule is implemented, the flight regulation measurement module may measure the flight distance using the method as described above. The flight regulation measurement module may be configured to select a proper method to calculate the flight distance according to the current monitoring state of the UAV. In some cases, the measured regulation parameters and the flight regulation strategy may be provided to the flight controller 911 to regulate the flight of the UAV. For instance, when the measured flight distance exceeds the limit as set by the flight distance regulation, the flight controller may control the UAV to return to its starting point.

In some embodiments, when the UAV enters a regulation mode or when the monitoring state of the UAV is assessed to be invalid, an alert may be generated. In some cases, the alert may be sent to the control station or remote controller in communication with the UAV. The alert may be used to inform the operator of the UAV that the UAV is under flight regulation. In some cases, the alert may be sent to the detection system such as displayed on the display device coupled to the detection system. For instance, a user who monitors the UAVs using the detection system may be informed that a particular UAV is under flight regulation.

In some embodiments, the flight regulation module and the flight regulation measurement module may be implemented using one or more processors. The one or more processors may be on-board the UAV. The flight regulation module and the flight regulation measurement module can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers.

Figure 10:
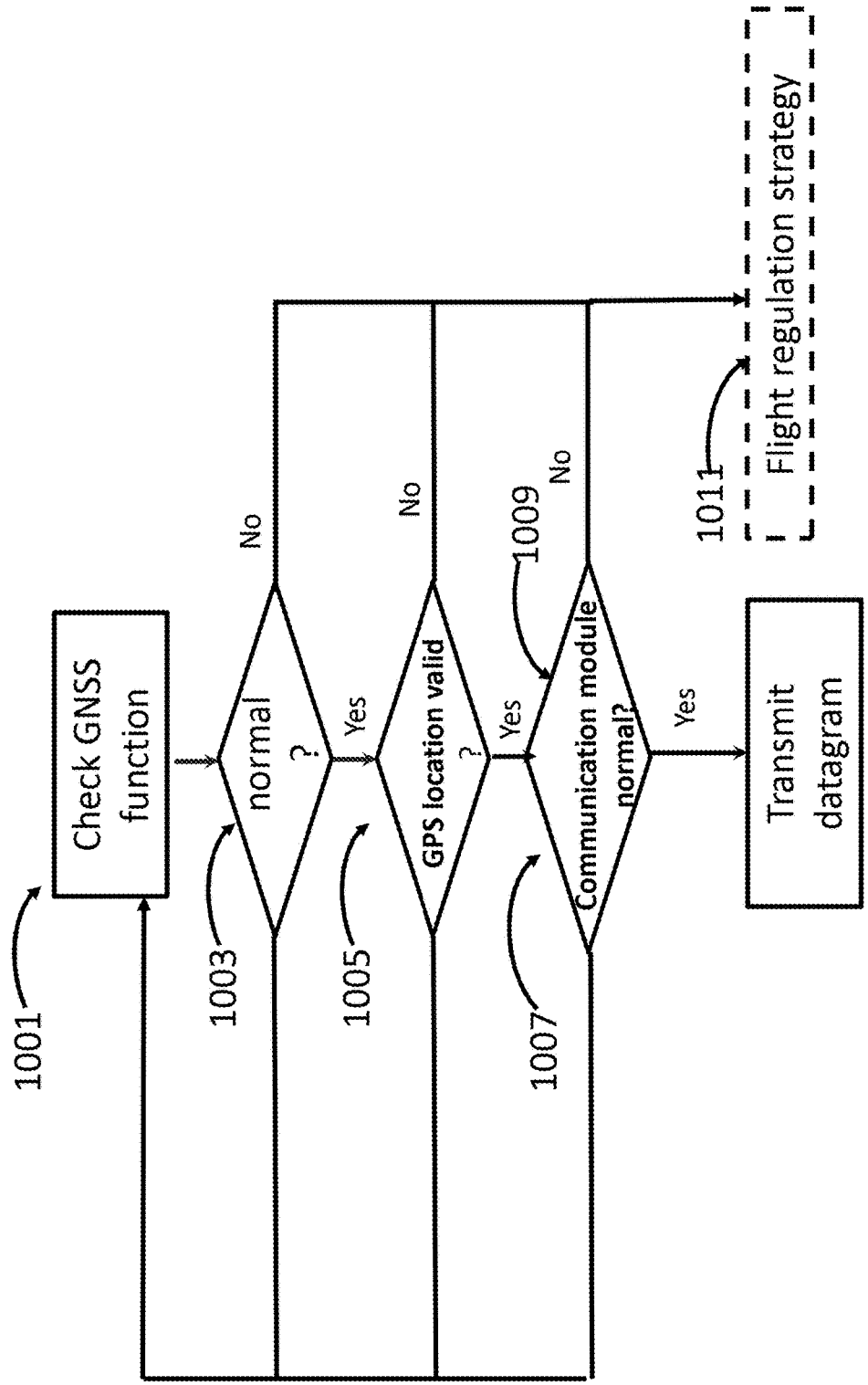
FIG. 10 illustrates a flow chart of an exemplary method of monitoring and regulating a UAV.

FIG. 10 illustrates a flow chart of an exemplary method of monitoring and regulating a UAV. The method may begin with checking a status of the location module 1001. For example, the GNSS may be checked for its functionality. The status of the location module may be determined whether is normal or valid 1003. If the status is determined to be invalid or not normal, a flight regulation strategy or a set of regulation rules may be determined. For instance, a flight distance regulation or flight time regulation may be determined for regulate the flight of the UAV. In the case a flight distance regulation is selected, the flight distance may be obtained by measuring the RTT or the wireless signal strength. If the status is valid or normal, the location data (e.g., GPS location) may be checked for its validity 1005. If the location data is determined to be invalid, a flight regulation strategy or a set of regulation rules may be determined. For instance, a flight distance regulation or flight time regulation may be determined for regulate the flight of the UAV. In the case a flight distance regulation is selected, the flight distance may be obtained by measuring the RTT or the wireless signal strength. If the location data is valid, the status of the communication module may be checked 1007.

If the status of the communication module is determined to be invalid or not normal, a flight regulation strategy 1011 or a set of regulation rules may be determined. The flight regulation strategy has been described elsewhere herein. The regulation strategy may include a set of regulation rules. In some cases, the regulation strategy may include one or more regulation rules selected from the rules for regulating altitude or height of the UAV, flight distance and flight time. For instance, distance of the UAV flight may be regulated, e.g. it has to be within certain distance from the remote controller. If the distance exceeds the distance limit, the UAV may be forced to land, to hover, or to return to its starting point. In another instance, the flight time may be regulated, e.g., when the time duration after a UAV has been powered-on exceeds certain threshold, the UAV may be forced to land, to hover, or to return to its starting point. In a further instance, a height or altitude of the UAV may be regulated, e.g., it has to be within certain height range otherwise the UAV may be forced to land, to hover, or to return to its starting point. Other rules may also be applied to regulate one or more flight capabilities of the UAV such as speed, functions of the UAV such as communication function, or equipment function (such as a camera or other type of payload) carried by the UAV may be required to suspend operations temporarily.

In the case a flight distance regulation is selected, the flight distance may be obtained by measuring the RTT, GPS location or the wireless signal strength. If the status is valid, the communication module may transmit a datagram comprising at least the location of the UAV as described elsewhere herein. One or more of the steps can be repeated at any desired rate. The rate may be less than or equal to about 1 s, 5 s, 10 s, 15 s, 20 s, 30 s, 1 min, 2 min, 5 min.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method comprising:
in response to receiving a selection instruction from a user, controlling one or more detectors not in communication with a terminal to only monitor communication between one or more movable objects and the terminal, the one or more movable objects being determined based on the selection instruction;
obtaining, by the one or more detectors, a datagram based on monitoring data from the communication between the one or more movable objects and the terminal, the monitoring data indicating a physical location of one of the one or more movable objects;
displaying a flight trajectory of the one of the one or more movable objects based on the physical location of the one of the one or more movable objects, the flight trajectory being generated based on a sequence of the monitoring data; and
determining a risk level based on the datagram.

2. The method of claim 1, wherein the datagram is to be received by the one or more detectors, at least a portion of working data is to be received and deciphered by the terminal but not to be deciphered by the one or more detectors, and the at least a portion of working data includes image or video data sent by the one or more movable objects to the terminal.

3. The method of claim 2, wherein the datagram includes a plurality of sub-datagrams, each of the plurality of sub-datagrams is transmitted by a transmitter cyclically with at least one of fixed time intervals or variable time intervals.

4. The method of claim 2, wherein the datagram includes a plurality of sub-datagrams, at least a portion of the working data is transmitted by a transmitter in a neighboring subframe between two consecutive sub-datagrams of the datagram.

5. The method of claim 4, wherein a guard interval is provided by the transmitter between one of two consecutive sub-datagrams of the datagram and the neighboring subframe to avoid transmission interference between movable object-detector communication and the movable object-terminal communication.

6. The method of claim 2, wherein the datagram includes a plurality of sub-datagrams, each sub-datagram of the datagram comprises an index indicating a sequence or order of the plurality of sub-datagrams for the one or more detectors to reconstruct or decipher the datagram.

7. The method of claim 2, wherein the at least a portion of working data is encrypted by a first encryption key known to the terminal but not known to the one or more detectors, wherein the datagram is encrypted using a second encryption key known to the one or more detectors, the encrypted datagram is to be received and deciphered by the one or more detectors using the second encryption key.

8. The method of claim 1, wherein the datagram is obtained using at least one of a different working frequency band, modulation scheme, coding scheme, data format, or communication protocol from at least a portion of working data, the at least a portion of working data including image or video data sent by the one or more movable objects to the terminal and one or more movement control signals sent by the terminal to the one or more movable objects.

9. The method of claim 1, wherein the physical location of the movable object includes geographic coordinates information of the movable object obtained by a first location sensor, and the physical location of the terminal includes geographic coordinates information of the terminal obtained by a second location sensor.

10. The method of claim 1, wherein:
the one or more detectors include a plurality of detectors in a zone; and
the method further comprises:
determining the risk level associated with the movable object in the zone based on a plurality of datagrams from the plurality of detectors.

11. The method of claim 1, wherein the datagram is transmitted along with working data, the working data including at least one of image or video data sent by the movable object to the terminal or one or more movement control signals sent by the terminal to the movable object.

12. The method of claim 1, wherein determining the risk level based on the datagram includes determining the risk level based on the flight trajectory of the selected one of the plurality of movable objects.

13. The method of claim 1, further comprising:
displaying, on a graphical display, a boundary of an area monitored by the one or more detectors.

14. The method of claim 1, wherein the monitoring data further includes a type of the selected one of the plurality of movable objects defined by one or more physical components of the selected one of the plurality of movable objects or one or more functions of the selected one of the plurality of movable objects, and a security level or a priority level of the selected one of the plurality of movable objects is determined based on the type of the selected one of the plurality of movable objects.

15. A system comprising:
one or more processors at one or more detectors configured to:
in response to receiving a selection instruction from a user, control the one or more detectors not in communication with a terminal to only monitor communication between one or more movable objects and the terminal, the one or more movable objects being determined based on the selection instruction;
obtain a datagram based on monitoring data from the communication between the one or more movable objects and the terminal, the monitoring data indicating at least one of a location of one of the one or more movable objects, a location of the terminal in communication with the one or more movable objects, a movable object identifier of one of the one or more movable objects, a user identifier, a type of one of the one or more movable objects, or an identifier of the terminal; and
determine a risk level by retrieving pre-stored risk information associated with the movable object based on the datagram.

16. The system of claim 15, wherein the datagram is transmitted by a transmitter, encrypted working data is transmitted by the transmitter, the datagram is to be received by the one or more detectors, the encrypted working data is encrypted by an encryption key known to the control terminal but not known to the one or more detectors, and the encrypted working data is to be received and deciphered by the terminal using the encryption key.

17. The system of claim 15, wherein the one or more detectors are in communication with a server, the risk information being stored in the server.

18. A method for monitoring a movable object, comprising:
- monitoring, by one or more detectors not in communication with a terminal, a communication between the movable object and the terminal;
- obtaining, by the one or more detectors, a datagram based on monitoring data from the communication between the movable object and the terminal, the monitoring data indicating a physical location of the movable object and a physical location of the terminal in communication with the movable object, wherein the physical location of the movable object includes geographic coordinates information of the movable object obtained by a first location sensor, the physical location of the terminal includes geographic coordinates information of the terminal obtained by a second location sensor;
- determining a risk level based on the datagram; and
- in response to determining that a monitoring state of the movable object is invalid, controlling the movable object to enter a flight regulation mode and sending an alert to the terminal, the monitoring state of the movable object being determined to be invalid in response to at least one of a location module malfunctioning or being powered-off, location data being determined to be invalid, or a status of a communication channel being determined to be invalid.

19. The method of claim 18, wherein the physical location of the movable object is obtained at a first frequency, the physical location of the terminal is obtained at a second frequency lower than the first frequency.

20. The method of claim 18,
- wherein the movable object is one of a plurality of movable objects monitored by the one or more detectors,
- the method further comprising:
  - displaying information of one of the plurality of movable objects selected by a user without affecting monitoring another one of the plurality of movable objects.

* * * * *